US008315401B2

(12) United States Patent
Hayakawa et al.

(10) Patent No.: US 8,315,401 B2

(45) Date of Patent: Nov. 20, 2012

(54) SPEAKER SYSTEM

(75) Inventors: Takahiro Hayakawa, Kanagawa (JP); Noboru Katta, Kanagawa (JP); Junichi Matsuda, Kanagawa (JP); Kenichi Noguchi, Tokyo (JP)

(73) Assignee: Panasonic Corporation, Osaka (JP)

( * ) Notice: Subject to any disclaimer, the term of this patent is extended or adjusted under 35 U.S.C. 154(b) by 482 days.

(21) Appl. No.: 12/373,631

(22) PCT Filed: May 28, 2007

(86) PCT No.: PCT/JP2007/060827

§ 371 (c)(1), (2), (4) Date: Feb. 11, 2009

(87) PCT Pub. No.: WO2008/007502

PCT Pub. Date: Jan. 17, 2008

(65) Prior Publication Data

US 2010/0272271 A1 Oct. 28, 2010

(30) Foreign Application Priority Data

Jul. 14, 2006 (JP) ................................ 2006-194812

(51) Int. Cl.
*H04R 1/00* (2006.01)

(52) U.S. Cl. ............................ 381/59; 381/86; 381/332

(58) Field of Classification Search .................... 381/59, 381/300–303, 307–310
See application file for complete search history.

(56) References Cited

U.S. PATENT DOCUMENTS 4,764,960 A * 8/1988 Aoki et al. .................... 381/303
5,389,867 A 2/1995 Adachi et al.
5,809,150 A * 9/1998 Eberbach ...................... 381/300
2004/0105550 A1 6/2004 Aylward et al.
2006/0082835 A1 4/2006 Murai et al.
2008/0170729 A1 * 7/2008 Lissaman et al. ............. 381/303

FOREIGN PATENT DOCUMENTS

DE 10324640 5/2004
JP 63-26197 2/1988
JP 11-075284 3/1990

(Continued)

OTHER PUBLICATIONS

English language Abstract of JP 2003-48490, Feb. 18, 2003.
English language Abstract of JP 6-153290, May 31, 1994.
English language Abstract of JP 2004-289341, Oct. 14, 2004.

(Continued)

*Primary Examiner* — David Vu
*Assistant Examiner* — Jonathan Han
(74) *Attorney, Agent, or Firm* — Greenblum & Bernstein, P.L.C.

(57) ABSTRACT

A loudspeaker system capable of simultaneously providing listeners with a listening environment not giving them a feeling of strangeness. The loudspeaker system (100) comprises drive motors (111 to 113, 121 to 123) for so driving at least first R-channel loudspeaker (101) that the current first listening position is substantially included in the perpendicularly bisecting plane of a line joining the intersecting point of the first R-channel speaker (101) and its directivity axis and the intersecting point of the second R-channel loudspeaker (120) and its directivity axis and so driving at least fourth L-channel loudspeaker (104) that the current second listening point is substantially included in the perpendicularly bisecting plane of the line joining the intersecting point of a third L-channel loudspeaker (103) and its directivity axis and the intersecting point of a fourth L-channel loudspeaker (104) and its directivity axis. The loudspeaker system (100) further comprises their motor driver section (130).

10 Claims, 18 Drawing Sheets

FOREIGN PATENT DOCUMENTS

| | | |
|---|---|---|
| JP | 3-077500 | 4/1991 |
| JP | 6-072253 | 3/1994 |
| JP | 6-72253 | 3/1994 |
| JP | 6-153290 | 5/1994 |
| JP | 2001-298787 | 10/2001 |
| JP | 2003-48490 | 2/2003 |
| JP | 2004-289341 | 10/2004 |

OTHER PUBLICATIONS

Search report from E.P.O. that issued with respect to patent family member European Patent Application No. 07744261.4, mail date is Mar. 25, 2011.

Japan Office action that issued with respect to patent family member Japanese Patent Application No. 2006-194812, mail date is Sep. 6, 2011.

* cited by examiner

| POSITION OF LISTENER | ROTATION | OPENING ANGLE | ELEVATING ANGLE |
|---|---|---|---|
| FRONT | TO LEFT | WIDEN | WIDEN |
| BACK | TO RIGHT | NARROW | NARROW |
| UP | NO CHANGE | NO CHANGE | WIDEN |
| DOWN | NO CHANGE | NO CHANGE | NARROW |
| LEFT | TO LEFT | WIDEN | NO CHANGE |
| RIGHT | TO RIGHT | NARROW | NO CHANGE |

FIG.10

| POSITION OF LISTENER | ELEVATING ANGLE DIFFERENCE | | | |
|---|---|---|---|---|
| | UPON UPWARD SHIFT ON ELEVATING ANGLE 460 | | UPON DOWNWARD SHIFT ON ELEVATING ANGLE 460 | |
| | DRIVER' S SEAT | FRONT PASSENGER SEAT | DRIVER' S SEAT | FRONT PASSENGER SEAT |
| FRONT | NEGATIVE | POSITIVE | POSITIVE | NEGATIVE |
| BACK | POSITIVE | NEGATIVE | NEGATIVE | POSITIVE |
| UP | NO CHANGE | NO CHANGE | NO CHANGE | NO CHANGE |
| DOWN | NO CHANGE | NO CHANGE | NO CHANGE | NO CHANGE |
| LEFT | POSITIVE | POSITIVE | NEGATIVE | NEGATIVE |
| RIGHT | NEGATIVE | NEGATIVE | POSITIVE | POSITIVE |

FIG.17

SPEAKER SYSTEM

TECHNICAL FIELD

The present invention relates a speaker system that includes a pair of speaker units each including at least two speakers.

BACKGROUND ART

A conventional speaker system includes, for example, an L channel speaker unit, an R channel speaker unit and a center speaker unit (for example, see Patent Document 1). Each of the above three speaker units is arranged in the center of positions ahead of the driver's seat and passenger seat of a vehicle. The L channel speaker unit is directed toward a direction in which the directivity axis of the L channel speaker unit is rotated counterclockwise in the horizontal direction with respect to the traveling direction of the vehicle and in which the directivity axis is inclined at a predetermined angle to the vertical direction with respect to the traveling direction of the vehicle. The R channel speaker unit is directed toward a direction in which the directivity axis of the R channel speaker unit is rotated clockwise in the horizontal direction with respect the traveling direction of the vehicle and in which the directivity axis is inclined at a predetermined angle in the vertical direction with respect to the traveling direction of the vehicle. The center speaker unit outputs an −L-R signal obtained by adding an −L signal which is a reverse phase signal of an L channel signal and an −R signal which is a reverse phase signal of the R channel signal.

Patent Document 1: Japanese Patent Application Laid-Open No. 2004-289341

DISCLOSURE OF INVENTION

Problems to be Solved by the Invention

With such a conventional speaker system mounted in a vehicle, given that a difference (path length difference) is caused between the lengths of the paths for the L and R channel signals through which the Both signals reaches the listener in the driver's seat, a phase difference and delay are caused between the both channel signals before they reach the listener. The same applies to the listener in the front passenger seat. There is a problem that listeners feel a sense of discomfort listening to audio due to the above phase difference and delay.

In view of the above, it is therefore an object of the present invention to provide a speaker system that makes it possible to provide a listening environment which does not give a sense of discomfort to a plurality of listeners.

Means for Solving the Problem

In order to achieve the above object, the speaker system according to the present invention comprises: a first speaker unit including a first speaker outputting a sound to be heard in a first listening position and a second speaker outputting a sound to be heard in a second listening position; a second speaker unit including a third speaker outputting a sound to be heard in the first listening position and a fourth speaker outputting a sound to be heard in the second listening position; and a driving section configured to drive at least the first speaker such that the current first listening position is substantially included in a vertical bisector plane of a line connecting an intersection of the first speaker and a directivity axis of the first speaker and an intersection of the second speaker and a directivity axis of the second speaker, and to drive at least the fourth speaker such that the current second listening position is substantially included in a perpendicular bisector plane of a line connecting an intersection of the third speaker and a directivity axis of the third speaker and an intersection of the fourth speaker and a directivity axis of the fourth speaker.

Advantageous Effect of the Invention

In the above speaker system, at least the first speaker and the fourth speaker are driven as described above. Consequently, sounds without a phase difference and delay are more easily provided to the listeners at the first listening position and the second listening position. In this way, according to the present invention, it is possible to provide a speaker system that is able to provide to a plurality of listeners at the same time a listening environment which does not give a sense of discomfort.

BRIEF DESCRIPTION OF DRAWINGS

FIG. 10 is a diagram illustrating a table of control content of "rotation," "opening angle" and "angle of elevation" corresponding to a change in the position of the listener of the speaker system according to above Embodiment 1;

FIG. 17 is a diagram illustrating a table of control content of the differences between angles of elevations in the position of the listener (the position of the head) of the speaker system according to above Embodiment 1;

BEST MODE FOR CARRYING OUT THE INVENTION

Embodiments of the present invention will be described in detail below with reference to the drawings.

Embodiment 1

Figure 1:
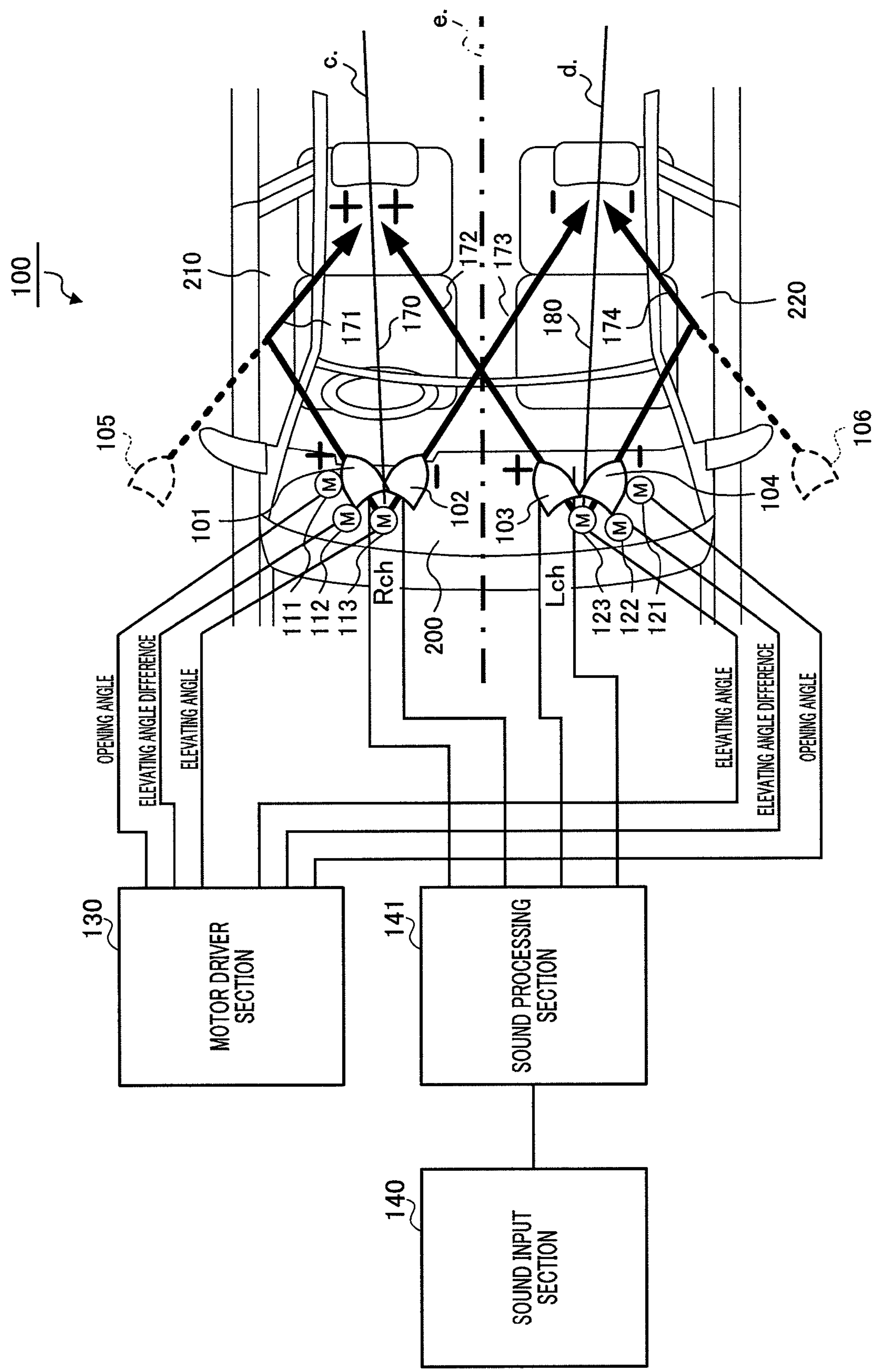
FIG. 1 is a diagram illustrating from above the interior of a vehicle mounting a speaker system according to Embodiment 1 of the present invention.
Figure 2:
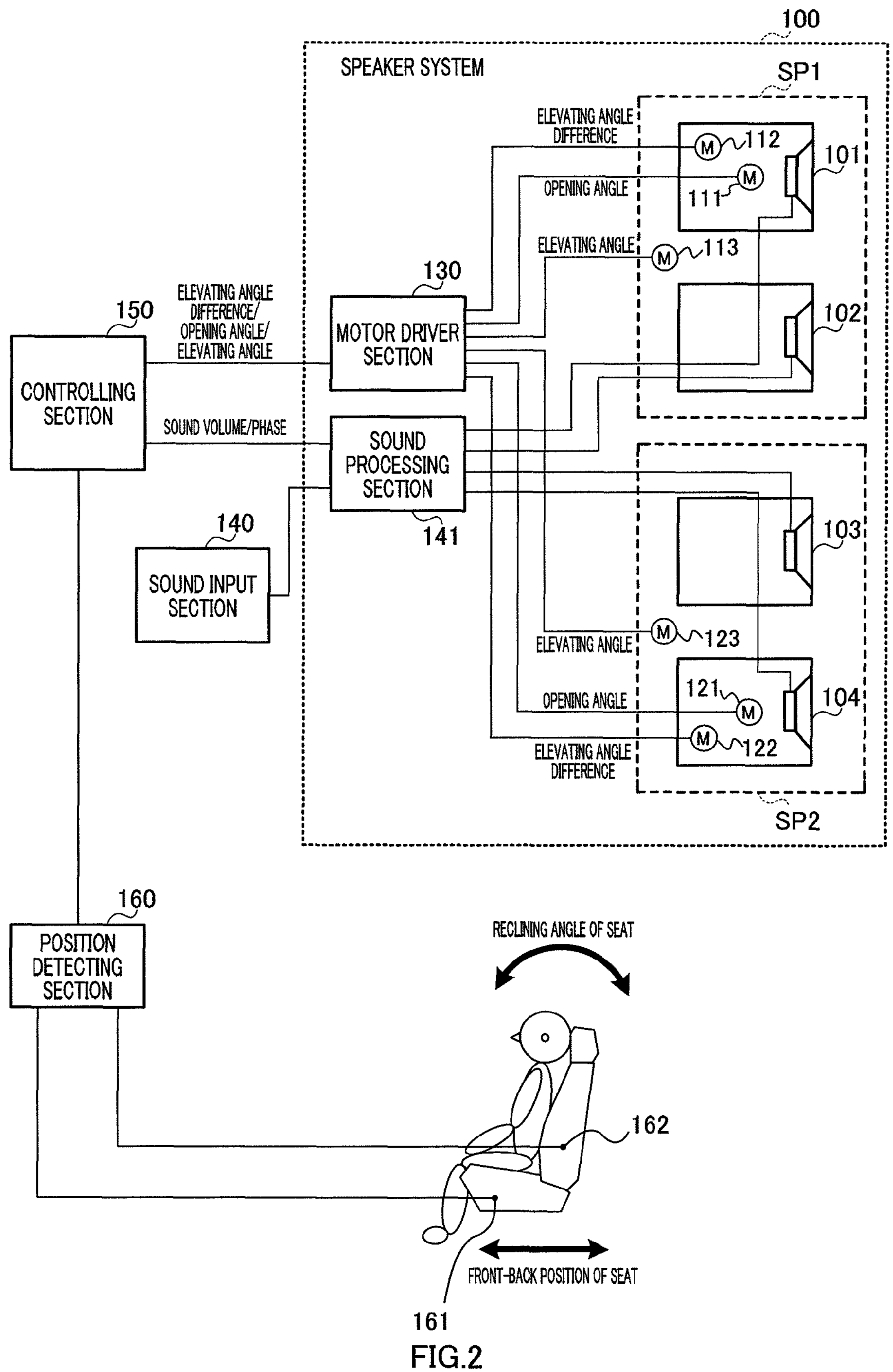
FIG. 2 is a diagram illustrating the overall configuration of the speaker system according to above Embodiment 1.

FIG. 1 is a schematic view illustrating a speaker system 100 according to Embodiment 1 of the present invention and the interior of a vehicle mounting the speaker system 100 from above. FIG. 2 is a block diagram illustrating the speaker system 100 shown in FIG. 1 and peripheral components of the speaker system 100.

In FIG. 1 and FIG. 2, the speaker system 100 comprises a first R channel speaker 101, a second R channel speaker 102, a third L channel speaker 103 and a fourth L channel speaker 104, each of the speakers 101 to 104 outputting sound of the middle and high frequency range (about 200 Hz to 20 kHz).

The first R channel speaker 101 is arranged virtually in front of the driver's seat of the vehicle (for example, in/on a dashboard 200) in an initial state and outputs sound based on the in-phase signal of the R channel signal (hereinafter referred to as "in-phase signal (R)") from the sound source.

Further, the second R channel speaker 102 is arranged in an initial state in a position in plane symmetry with the first R channel speaker 101 with respect to the first virtual plane and is arranged virtually in front of the driver's seat, and outputs sound based on the reverse phase signal (hereinafter "reverse phase signal (R)") having a reverse phase with respect to the above in-phase signal (R).

Furthermore, the above first virtual plane will be referred to as the "first reference plane c" in the following description. With the present embodiment, this first reference plane c is parallel or virtually parallel to the longitudinal intermedian plane e of the vehicle, includes the listening position (hereinafter referred to as "the first listening position") for the listener sitting in the driver's seat and passes the middle point of the first and second R channel speakers 101 and 102. Further, as illustrated with the present embodiment, the first listening position is determined in advance around the head of the listener sitting in the driver's seat.

Furthermore, the third L channel speaker 103 is arranged virtually in front of the front passenger seat next to the driver's seat (for example, in/on the dashboard 200) in an initial state, and outputs sound based on the in-phase signal of the L channel signal (hereinafter referred to as "in-phase signal (L)") from the same sound source as above.

The fourth L channel speaker 104 is arranged in an initial state in a position in plane symmetry with the third L channel speaker 103 with respect to the second virtual plane and is arranged virtually in front of the front passenger seat, and outputs sound based on the reverse phase signal (hereinafter referred to as "reverse phase signal (L)") having a reverse phase with respect to the above in-phase signal (L).

The above second virtual plane will be referred to as "second reference plane d" in the following description. With the present embodiment, this second reference plane d is parallel or virtually parallel to the longitudinal intermedian plane e of the vehicle, includes the listening position for the listener sitting in the front passenger seat (hereinafter referred to as "the second listening position") and passes the middle point of the third and fourth L channel speakers 103 and 104. Further, as illustrated with the present embodiment, the second listening position is determined in advance around the head of the listener sitting in the front passenger seat.

As described above, the first R channel speaker 101 outputs sound based on the in-phase signal (R) and the second R channel speaker 102 outputs sound based on the reverse phase signal (R). Consequently, on and near the first reference plane c, sound based on the in-phase signal (R) and sound based on the reverse signal (R) cancel each other and the listener sitting in the driver's seat feels like sound does not come from the front. A plane in which sound based on the in-phase signal and sound based on the reverse phase signal of the in-phase signal cancel each other, will be referred to as a "null plane." This null plane will be described later referring to FIG. 11 to FIG. 14. In FIG. 1, the first reference plane c is a null plane in which sound based on the in-phase signal (R) and sound based on the reverse phase signal (R) cancel each other. In the null plane, the listener feels like speakers installed virtually in front of the listener do not exist in hearing and the sound comes from the right and left speakers (one is a virtual image). Given that the same phenomenon occurs in the third L channel speaker 103 and fourth L channel speaker 104, the listener sitting in the front passenger seat feels like sound does not come from the front of the listener. In FIG. 1, the second reference plane d is a null plane in which sound based on the in-phase signal (L) and sound based on the reverse phase signal (L) cancel each other.

A pair of the first R channel speaker 101 and the second R channel speaker 102 composes a speaker unit SP1 of the driver's seat side, and a pair of the third L channel speaker 103 and the fourth L channel speaker 104 composes a speaker unit SP2 of the front passenger seat side. In this way, the speaker units SP1 and SP2 are arranged in the driver's seat side and in the front passenger seat side of the dashboard 200, respectively. Further, the first R channel speaker 101 and the third L channel speaker 103 compose speakers for the listener (driver) in the driver's seat, and the second R channel speaker 102 and the fourth L channel speaker 104 compose speakers for the listener in the front passenger seat.

Further, in the first R channel speaker 101, driving motor 111 for changing the angle (hereinafter referred to as the "opening angle") with respect to the first reference plane c and a driving motor 112 for changing at least the difference of the angle (hereinafter referred to as the "difference of angle of elevation") of the directivity axis of the first R channel speaker 101 in the perpendicular direction with respect to the directivity axis of the second R channel speaker 102, are installed. In the speaker unit SP1, a driving motor 113 that, while maintaining the difference of angle of elevation between the directivity axis of the first R channel speaker 101 and the directivity axis of the second R channel speaker 102, changes both the direction of the directivity axis of the first R channel speaker 101 and the direction of the directivity axis of the second R channel speaker 102 with respect to the plane where the speaker unit SP1 is installed. In this way, in the speaker unit SP1, the driving motor 111 for changing the opening angle and the driving motor 112 for changing the above difference of angle of elevation are installed only in the first R channel speaker 101, and, in the second R channel speaker 102, driving motors for changing these opening angle and difference of angle of elevation are not installed. Further, the angle of elevation of the overall speaker unit SP1 can be changed by the driving motor 113.

Similarly, in the fourth L channel speaker 104, a driving motor 121 for changing the angle (i.e. opening angle) with respect to the second reference plane d and a driving motor 122 for changing at least the difference of the angle (i.e. difference of angle of elevation) of the directivity axis of the fourth L channel speaker 104 in the perpendicular direction with respect to the directivity axis of the third L channel speaker 103, are installed. In the speaker unit SP2, a driving motor 123 is installed in order to changes, while maintaining the difference of angle of elevation between the directivity axis of the fourth L channel speaker 104 and the directivity axis of the third L channel speaker 103, the directions of the directivity axis of the fourth L channel speaker 104 and the directivity axis of the third L channel speaker 103 with respect to the plane where the speaker unit SP2 is arranged. In this way, in the speaker unit SP2, the driving motor 121 for changing the opening angle and the driving motor 122 for changing the difference of angle of elevation are installed only in the fourth L channel speaker 104, and, in the third L channel speaker 103, driving motors for changing these opening angle and difference of angle of elevation are not installed. Further, the angle of elevation of the overall speaker unit SP2 can be changed by the driving motor 123. The above driving motors 111 to 113 and 121 to 123 are composed of, for example, stepping motors and enable precise control.

The opening angle, the difference of angle of elevation and the angle of elevation as mentioned above will be described later referring to FIG. 9 to FIG. 14 and FIG. 16.

Further, in FIG. 1 and FIG. 2, the speaker system 100 comprises a motor driver section 130 that drives the driving motors 111 and 121 for changing the opening angles, the driving motors 112 and 122 for changing the differences of angles of elevations and the driving motors 113 and 123 for changing the angles of elevations of speaker units SP1 and SP2; and a sound processing section 141 that carries out signal processing of a 2-channel (i.e. L channel and R channel) signal from a sound input section 140, to which the sound source composed of the 2-channel signal is inputted, and generates the in-phase signal (R), the reverse phase signal (R), the in-phase signal (L) and the reverse phase signal (L) as mentioned above.

The in-phase signal (R), the reverse phase signal (R), the in-phase signal (L) and the reverse phase signal (L) that are generated by sound processing section 141, are outputted to the first R channel speaker 101, the second R channel speaker 102, the third L channel speaker 103 and the fourth L channel speaker 104, respectively.

The sound input section 140 is an input terminal that receives as input a sound source from audio devices such as CD players, DVD players, MD players, cassette decks, radios, television receivers and semiconductor memory audio devices or speech input apparatuses such as microphones. Further, the sound input section 140 may be an audio device or speech input apparatus itself.

Further, a sound processing section 141 includes delay units (not shown) and can produce phase differences (i.e. delay) between the outputs of the first R channel speaker 101 and the second R channel speaker 102 or between the outputs of the third L channel speaker 103 and the fourth L channel speaker 104 by the delay units. It is possible to adjust a shift in sounds due to the difference between the right and left paths by adjusting the phase difference (i.e. delay).

In FIG. 2, in the speaker system 100 in the vehicle, a controlling section 150 that controls, for example, the opening angle depending on the listening positions of a plurality of listeners and a position detecting section 160 that receives signals from contact switches 161 and 162 which detect the front-back position of a seat and the reclining angle of the seat and detects the location of the head of the seated listener.

The controlling section 150 includes a microprocessor, acquires head position information of the listener from the position detecting section 160 by executing a control program to be described later referring to FIG. 18, refers to various setting information and a table stored in a storing medium (for example, semiconductor memory) (not shown), outputs to, the motor driving section 130 the control commands for adjusting the opening angles of the speakers 101 to 104, the differences of angles of elevations between the speakers 101 to 104 and the angles of elevations of the speaker units SP1 and SP2 and outputs to the sound processing section 141 the control signal for adjusting sound volumes from the speakers 101 to 104 and the phases of output sounds from the speakers 101 to 104, depending on the current listening position. The motor driver section 130 precisely controls the drive amount of the corresponding driving motor according to the above control commands and changes the opening angles of the speakers 101 to 104, the differences of angles of elevations between the speakers 101 to 104 and the angles of elevations of the speaker units SP1 and SP2 to target values. Further, the sound processing section 141 changes the sound volumes to be outputted from the speakers 101 to 104 and the phases of sounds to be outputted from these speakers 101 to 104, according to the control signals from the controlling section 150. Further, the sound volume and the phase are controlled by the sound processing section 141, in this case, to adjust the sound pressure level and a shift in phases caused by adjustment of the above opening angle, the differences of angles of elevations and the angles of elevations.

Further, the controlling section 150 is a controlling apparatus that controls the speaker system 100 and may be installed outside the speaker system 100 or may be incorporated inside. Further, the controlling section 150 may be incorporated in an audio device such as a car audio device. In this case, the controlling section of the audio device such as the car audio device executes a control program to be described later in FIG. 18.

Further, with the present embodiment, the position detecting section 160 detects the current listening position (for example, the position of the head of the listener) based on detected signals from the contact switches 161 and 162 installed in the seat. The method of detecting the position of the head of the listener from the seat position provides an effect of realizing the present invention at a lower cost and at more ease. Further, although only the contact switches 161 and 162 in one seat are shown in FIG. 2, in practice, a set of contact switches 161 and 162 are installed in the driver's seat and in the front passenger seat. That is, the current first listening position is detected based on detected signals outputted from the contact switches 161 and 162 of the driver's seat side and the current second listening position is detected based on detected signals from a set of contact switches of the front passenger seat side.

Further, a configuration may be possible where, for example, a camera that takes an image of the vicinity of the listener's head and an image processing section that recognizes an image of positions of the head and ears from this image are installed instead of the position detecting section 160 to directly detect the positions of the head and ears of the listener.

[Basic Installment of Speakers and Speaker Units]

The first R channel speaker 101 and the second R channel speaker 102 are mounted in the dashboard 200 of the driver's seat side such that the opening angle and the angle of elevation described below are formed. Similarly, the third L channel speaker 103 and the fourth L channel speaker 104 are mounted in the dashboard 200 of the front passenger seat side such that the opening angle and the angle of elevation described below are formed.

(1) The first speaker unit SP1 is arranged in a location where an extension line of a bisector 170 of the opening angle, which is formed by the directivity axis of the first R channel speaker 101 and the directivity axis of the second R channel speaker 102, is parallel or virtually parallel to the longitudinal intermedian plane e of the vehicle and passes the first listening position. Further, the extension line of the bisector 170 is included in the first reference plane c in which the in-phase signal (R) and its reverse phase signal (R) cancel each other. Similarly, the second speaker unit SP2 is arranged in a location where an extension line of a bisector 180 of the opening angle, which is formed by the directivity axis of the third L channel speaker 103 and the directivity axis of the fourth L channel speaker 104, is parallel or virtually parallel to the longitudinal intermedian plane e of the vehicle and passes the second listening position. The extension line of the bisector 180 is included in the second reference plane d in which the in-phase signal (L) and its reverse phase signal (L) cancel each other. By this means, the first R channel speaker 101 and the second R channel speaker 102 are arranged virtually in front of the driver, and the third L channel speaker 103 and the fourth L channel speaker 104 are arranged virtually in front of the listener in the front passenger seat. Consequently, as described above, each listener sitting in the driver's seat and the front passenger seat feels like sound does not come from the front.

(2) The position of the first speaker unit SP1 is determined such that the distance of a path 171 through which sound is reflected by a right side glass 210 and reaches from the first R channel speaker 101 the right ear of the driver and the distance of a path 172 through which sound reaches from the third L channel speaker 103 directly the left ear of the driver, are equal. Similarly, the position of the second speaker unit SP2 is determined such that the distance of a path 173 through which sound reaches from the second R channel speaker 102 directly the right ear of the listener in the front passenger seat and the distance of a path 174 through which sound is reflected by a left side glass 220 and reaches from the fourth L channel speaker 104 the left ear of the driver, are equal.

(3) The first speaker unit SP1 and the second speaker unit SP2 are arranged in positions in plane symmetry with each other with respect to the longitudinal intermedian plane e including the longitudinal intermedian line of the vehicle.

Depending on the size of the vehicular interior, the position of the seat and the shape of the dashboard, there are cases where all of the above arrangement conditions (1) to (3) are not necessarily satisfied. In these cases, the first R channel speaker 101, the second R channel speaker 102, the third L channel speaker 103 and the fourth L channel speaker 104 are mounted by adjusting the arrangement and directions such that the above arrangement conditions (1) to (3) are satisfied as much as possible. What matters in hearing is the condition of above (2) that the distance of the path through which sound is reflected by the side glasses 210 and 220 and reaches the listener and the distance of the path through which sound reaches the listener directly, are equal. To prioritize this condition, a method of arranging the first R channel speaker 101 and the second R channel speaker 102, and the third L channel speaker 103 and the fourth L channel speaker 104 on the dashboard 200 by slightly shifting these speakers right and left or back and forth from the front of the driver or the listener in the front passenger seat, may be adopted. In this case, the first R channel speaker 101, the second R channel speaker 102, the third L channel speaker 103 and the fourth L channel speaker 104 may not be directed toward the listener in the driver's seat (i.e. driver) and the listener in the front passenger seat.

If the first R channel speaker 101, the second R channel speaker 102, the third L channel speaker 103 and the fourth L channel speaker 104 are suitably arranged on the dashboard 200 such that the above arrangement conditions (1) and (2) are satisfied, the driver does not listen to sound from the first R channel speaker 101 directly but listens to the sound reflected by the side glass 210. Consequently, the listener feels like sound based on the in-phase signal (R) comes from a virtual image 105 of the first R channel speaker 101 in the front right outside the vehicle. The listener sitting in the driver's seat feels like the virtual image 105 of this first R channel speaker 101 is in a position in symmetry with the third L channel speaker 103 with respect to the first reference plane c. By listening to sound from the virtual image 105 of this first R channel speaker 101 and sound from the third L channel speaker 103, the listener sitting in the driver's seat is able to listen to wide stereo sound in the narrow space in the vehicle in which installation of speakers is significantly restricted.

The second speaker unit SP2 is arranged in a position in symmetry with the first speaker unit SP1 with respect to the longitudinal intermedian plane e of the vehicle, the listener in the front passenger seat recognizes that there is a virtual image 106 of the fourth L channel speaker 104 in the front left outside the vehicle. Consequently, the listener sitting in the front passenger seat is able to listen to wide stereo sound, like the listener sitting in the driver's seat.

In this way, the speaker system 100 comprises the speaker unit SP1 composed of the first R channel speaker 101 that radiates the in-phase R channel signal and the second R channel speaker 102 that radiates the reverse phase R channel signal, and the speaker unit SP2 composed of the third L channel speaker 103 that radiates the in-phase L channel signal and the fourth L channel speaker 104 that radiates the reverse phase L channel signal. In the speaker unit SP1, the first R channel speaker 101 and the second R channel speaker 102 are in plane symmetry with respect to the first reference plane c including the current first listening position for the driver, and are arranged such that sound outputted from the first R channel speaker 101 is reflected by the side glass 210 and reaches the first listening position. The speaker unit SP2 is arranged in a position in plane symmetry with the first speaker unit SP1 with respect to the longitudinal intermedian plane e of the vehicle, the third L channel speaker 103 and the fourth L channel speaker 104 are in plane symmetry with respect to the second reference planed including the current second listening position for the listener in the front passenger seat and are arranged such that sound outputted from the fourth L channel speaker 104 is reflected by the side glass 220 and reaches the second listening position.

Further, the first R channel speaker 101 and the third L channel speaker 103 are arranged such that the distance through which sound outputted from the first R channel speaker 101 is reflected by the side glass 210 and reaches the first listening position and the distance through which sound outputted from the third L channel speaker 103 reaches directly the first listening position, are equal. The second R channel speaker 102 and the fourth L channel speaker 104 are arranged according to the same relationship as between the positions of the first R channel speaker 101 and the third L channel speaker 103.

By the above, it is possible to provide to the listeners, the sound of the R channel and the sound of the L channel with practically no phase difference and no delay. The listeners do not feel a sense of discomfort listening to audio. Further, the listener sitting in the front passenger seat is also able to listen to wide stereo sound like the listener sitting in the driver's seat.

[Detailed Arrangement of Speakers and Speaker Units]

Figure 3:
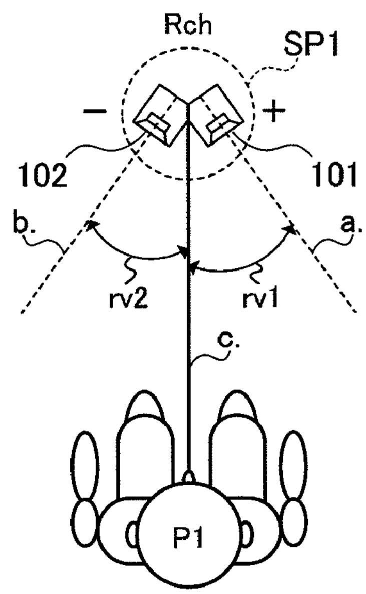
FIG. 3 is a plan view illustrating positions of the listener and the speaker unit of the speaker system according to above Embodiment 1.

FIG. 3 is a plan view illustrating the positions of the speaker unit and the listener, employing an example of the relationship between the positions of the speaker unit SP1 of the driver's seat side and the listener P1 in the driver's seat (i.e. driver).

As shown in FIG. 3, the speaker unit SP1 and the listener P1 in the driver's seat virtually face each other. Further, the reference symbol "a" is assigned to the directivity axis of the first R channel speaker 101 that radiates sound based on the in-phase signal (R) and the reference symbol "b" is assigned to the directivity axis of the second R channel speaker 102 that radiates sound based on the reverse phase signal (R). The reference symbol "c" is assigned to the above-described first reference plane. The first reference plane c is a null plane in which sound based on the in-phase signal (R) and sound based on the reverse phase signal (R) cancel each other. Further, assuming that the angle formed by the directivity axis a and the first reference plane c is rv1 and the angle formed by the directivity axis b and the first reference plane c is rv2, the condition of the following equation 1 for providing an effect of making the listener P1 sitting in the driver's seat feel like sound does not come from the front, is established.

$$rv1=rv2 \qquad \text{(Equation 1)}$$

Further, if the above equation 1 is satisfied, the speaker unit SP1 and the listener P1 need not to face each other as shown in, for example, FIG. 3.

Although the positions of the speaker unit SP1 of the driver's seat side and the listener P1 in the driver's seat (i.e. driver) have been described above, the same applies to the listener in the front passenger seat and the speaker unit SP2 of the front passenger seat side, that is, the in-phase signal (L) and the reverse phase signal (R).

Figure 4:
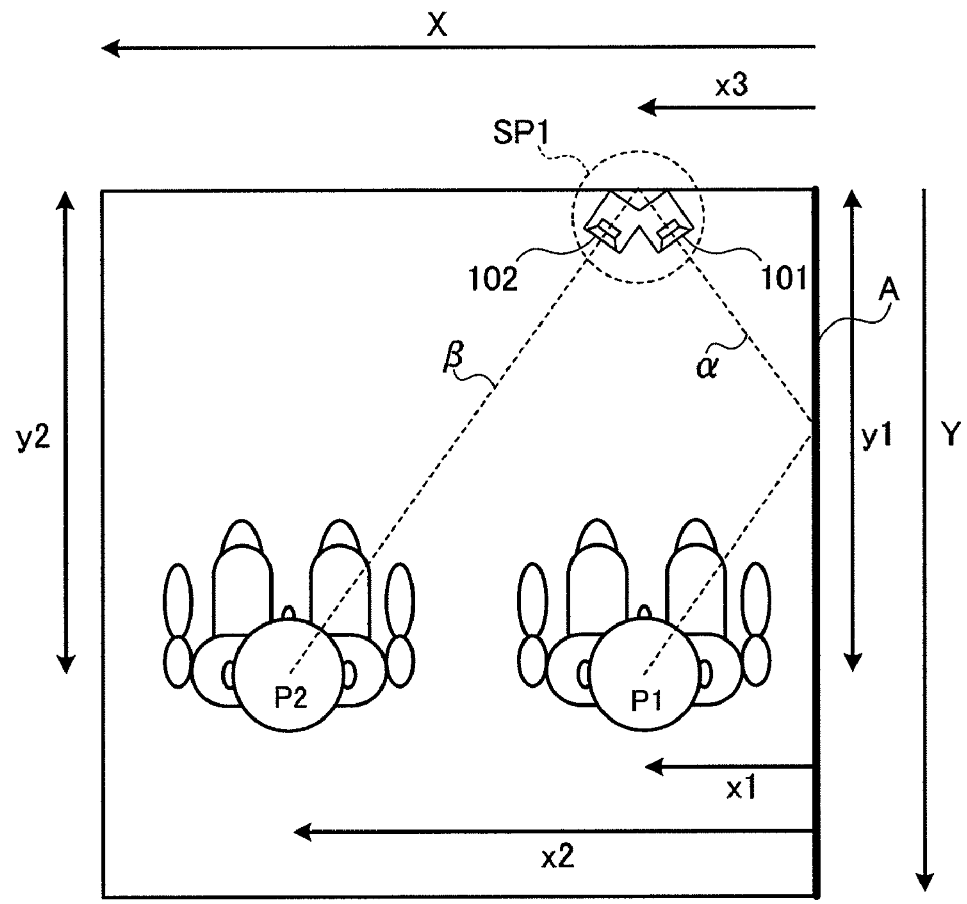
FIG. 4 is a schematic view illustrating the relationship between the position of the listener and the direction of the speaker unit of the speaker system according to above Embodiment 1.

FIG. 4 is a schematic view illustrating the relationship between the direction of a speaker unit and the location of the listener, employing an example of the relationship between the positions of the speaker unit SP1 of the driver's seat side, the listener P1 in the driver's seat (i.e. driver) and the listener P2 in the front passenger seat.

In FIG. 4, the speaker unit SP1 of the driver's seat side is installed on the dashboard 200 shown in FIG. 1. Further, the reflecting plane A of FIG. 4 is the side glass 210 of FIG. 1. This space inside the vehicle is represented by X and Y. In the width X in the space in the vehicle, to the reference point of the reflecting plane A, there are the distance x3 from the speaker unit SP1 of the driver's seat side, the distance x1 from the listener P1 in the driver's seat and the distance x2 from the listener P2 in the front passenger seat. Further, in the depth Y in the space in the vehicle, there is the distance y1 from the listener P1 in the driver's seat to the reference point of the speaker unit SP1 and there is the distance y2 from the listener P2 in the front passenger seat to the reference point of speaker unit SP1.

The reference symbol "α" (see the dotted line) is assigned to the path through which the sound outputted from the first R channel speaker 101 composing the speaker unit SP1 (i.e. the in-phase signal (R)) is reflected by the reflecting plane A and reaches the listener P1 in the driver's seat, and the reference symbol "β" (see the dotted line) is assigned to the path through which the sound outputted from the second R channel speaker 102 (i.e. the reverse phase signal (R)) reaches directly the listener P2 in the front passenger seat. Further, in case of FIG. 4, the speaker unit SP1 and the listener P1 in the driver's seat virtually face each other as described in FIG. 3, and, sounds radiated from the first R channel speaker 101 and the second R channel speaker 102 cancel each other near the first reference plane c, and so the listener P1 sitting in the driver's seat feels like sound does not come from the front.

Now, in the space inside the vehicle X and Y, such a relationship that the distance y1 to the listener P1 in the driver's seat and the distance y2 to the listener P2 in the front passenger seat are equal and the distance of the path α through which sound is reflected by the reflecting plane A and reaches the listener P1 in the driver's seat from the first R channel speaker 101 of the speaker unit SP1 and the distance of the path β through which sound reaches directly the listener P2 in the front passenger seat from the second R channel speaker 102 are equal, can be represented as follows.

$$y1=y2=y \qquad \text{Condition 1}$$

$$\text{path } \alpha=\text{path } \beta \qquad \text{Condition 2}$$

$$\text{Path } \alpha=((x1+x3)^2+(y1)^2)^{0.5} \qquad \text{(Equation 2)}$$

$$\text{Path } \beta=((x2-x3)^2+(y2)^2)^{0.5} \qquad \text{(Equation 3)}$$

The following equation 4 can be derived from the condition 2 and the above equations 2 and 3. Equation 5 can be obtained by applying the condition 1 to the equation 4 and figuring out x3.

$$((x1+x3)^2+(y1)^2)^{0.5}=((x2-x3)^2+(y2)^2)^{0.5} \qquad \text{(Equation 4)}$$

$$x3=0.5*(x2-x1) \qquad \text{(Equation 5)}$$

According to the above equation 5, the speaker unit SP1 needs to be arranged in the location at the distance x3 which is spaced apart from the reflecting plane A by a half of the distance between the two listeners P1 and P2.

Although the positions of the speaker unit SP1 of the driver's seat side, the listener P1 in the driver's seat and the listener P2 in the front passenger seat are described above, the same applies to the arrangement of the speaker unit SP2 of the front passenger seat side.

As long as the arrangement shown in FIG. 4 is realized, it is possible to provide a listening environment which does not give a sense of discomfort to listeners P1 and P2. However, FIG. 4 shows an example of a case where listeners P1 and P2 do not move, and, if the positions of the heads of listeners P1 and P2 (hereinafter "positions of listeners" or simply "listeners P1 and P2") move back and forth or right and left, there is a case where the above optimal listening positions are shifted and listeners P1 and P2 listening to sound from the speaker system 100 feel a sense of discomfort. To be more specific, if the position of the listener is shifted from a null plane (a plane in which sound based on the in-phase signal and sound based on the reverse phase signal cancel each other), sound comes from a speaker unit which assumingly does not exist and stereo sounds of the right and left speakers (one is a virtual image) are undermined. Further, a sense of discomfort is caused by the difference between the sound volume levels before and after movement and between the sound volumes of the right and left speakers.

For example, in the speaker system 100 of FIG. 1, if the driver or the listener sitting in the front passenger seat moves the seat back and forth as shown in FIG. 2 or changes the reclining angle, the head of the driver or the listener in the front passenger seat moves back and forth and consequently the listening position moves back and forth. In view of the above background, the speaker system 100 detects the current first and/or second listening positions if the location of the listener changes and, according to the detection result, automatically adjusts the opening angles of the speakers 101 to 104, the differences of angles of elevations between the speakers 101 to 104 and the angles of elevation of the speaker units SP1 and SP2 (hereinafter referred to as "such as directions of the speakers 101 to 104"). Details will be described below.

[Automatic Adjustment of Listening Positions]

[Adjustment Factors]

If the position of the listener moves, the following factors need to be focused upon to adjust such as directions of the speakers 101 to 104.

1. Upon Change Back and Forth
   Shift in the null plane (little)
   Change in the directivity axis of the speaker (moderate)
   Change in the path length through which sound is reflected by the reflecting plane and reaches the listener (little)
2. Upon Change Right and Left
   Shift in the null plane (significant)
   Change in the directivity axis of the speaker (little)
   Change in the path length through which sound is reflected by the reflecting plane and reaches the listener (significant)
3. Upon Change Up and Down
   Change in the directivity axis of a speaker Further, the above 1. to 3. are factors taking into account one speaker (for example, the first R channel speaker 101) that reflects sound on the reflecting plane and transmits sound to the listener. A change in the directivity axis of the speaker, a change in the path length and a change in the difference between the right and left paths, except the shift in a null plane, cause a change in the sound volume. Further, a change in the sound volume of the above speaker spreads to the sound volume difference from the other speaker (for example, the third R channel speaker 103) that transmits sound directly to the listener.

Figure 5:
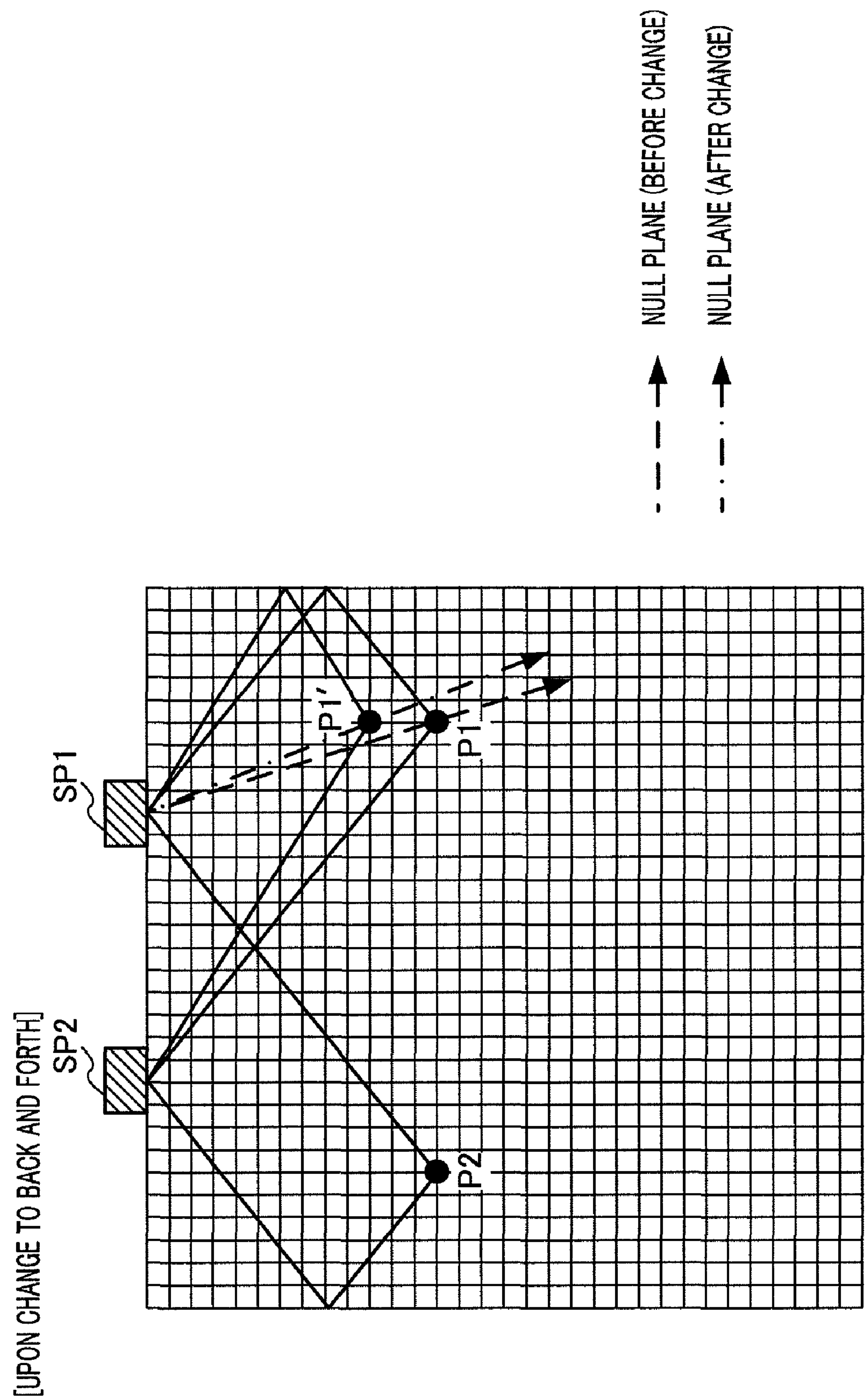
FIG. 5 is a schematic view illustrating the relationship between the positions of the speaker unit and the listener in case that the position of the listener of the speaker system according to above Embodiment 1 changes back and forth.
Figure 6:
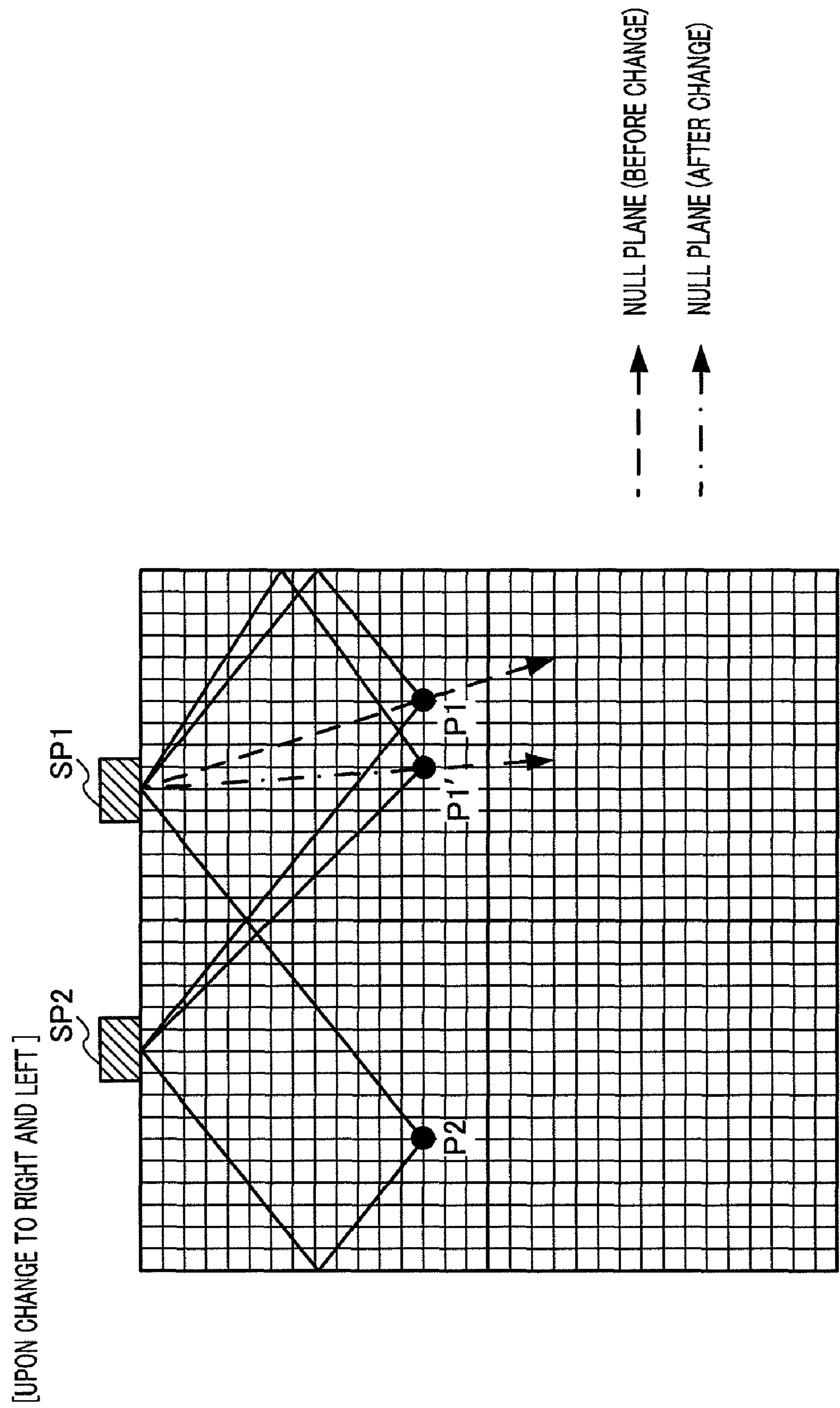
FIG. 6 is a schematic view illustrating the relationship between the positions of the speaker unit and the listener in case that the position of the listener of the speaker system according to above Embodiment 1 changes right and left.

FIG. 5 is a schematic view illustrating the relationship between the positions of the speaker unit and the listener if the positions of the listener changes back and forth. FIG. 6 is a schematic view illustrating the relationship between the positions of the speaker unit and the listener if the location of the listener changes right and left. The symbol "●" in the figure represents listeners P1 and P2, and P1' represents the position after the listener P1 moves. Further, the solid lines connecting the speaker units and the listeners represent the paths from the speaker units to the listeners. However, these solid lines do not represent the directivity axes of the speakers. Further, the bold broken line in the figure represents the null plane before change and the bold chain line in the figure represents the null plane after the change.

First, the above factors if the position of the listener P1 changes back and forth (that is, "shift in a null plane," "change in a directivity axis of the speaker," "change in the path length through which sound is reflected on the reflecting plane and reaches the listener") will be described.

As shown in FIG. 5, the listener P1 in the driver's seat (i.e. driver) moves forward and is located at P1'. The listener P2 in the front passenger seat does not move. In case of forward movement, the null plane (i.e. a plane in which sound based on the in-phase signal and sound based on the reverse phase signal cancel each other), in which the right and left path lengths from the speakers to the listener P1 are equal, moves forward. To see the movement of the null plane with reference to the line included in the null plane, the angle of the line included in the null plane changes (see the bold broken lines in the figure to the bold chain line in the figure). The difference between the right and left paths does not change. Further, given that the directivity axes of the speakers are shifted from the center of the listener P1', the right and left speakers are supposed to be used in an area of low speaker characteristics toward the listener. In this way, if the listener P1 moves back and forth, it is necessary to adjust the "shift in a null plane" and the "change in the directivity axis of the speaker."

Next, the above factors if the location of the listener P1 changes right and left will be described.

As shown in FIG. 6, the listener P1 moves forward and is located at P1'. The listener P2 does not move. In case of right and left movement, the right and left path lengths from the speakers to the listener P1 significantly change, thereby producing the difference between the right and left paths and, furthermore, the null plane moves right and left significantly. To see movement of the null plane with reference to a line included in the null plane, the angle of the line included in the null plane changes significantly (see the bold broken line in the figure to the bold chain line in the figure). Further, the directivity axes of the speakers are shifted from the center of the listener P1'. Consequently, if the listener P1 moves to the right and left, it is necessary to adjust the "shift in the null plane", the "change in the directivity axis of the speaker" and the "change in the path length." The "shift in the null plane" in particular is significantly great compared to the case of the change back and forth and therefore needs to be adjusted sufficiently.

Figure 7A:
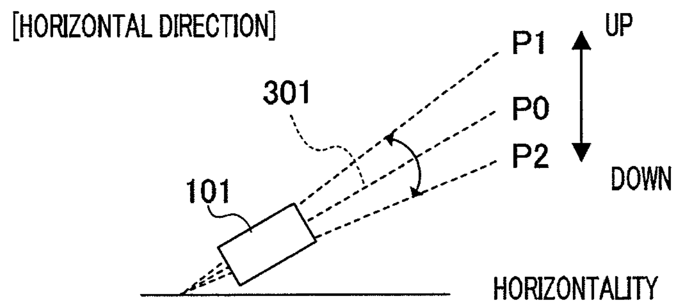
FIG. 7 illustrates the directivity axis of the speaker in case that the position of the listener of the speaker system according to above Embodiment 1 changes up and down.
Figure 7B:
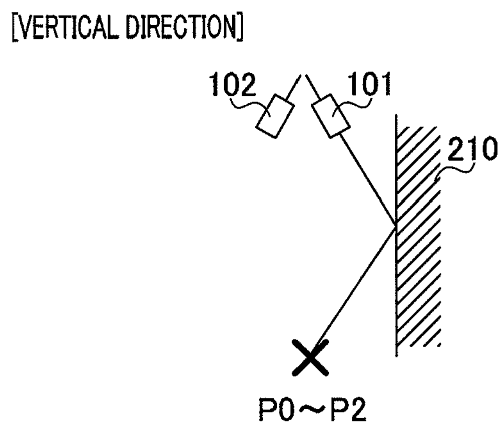

FIGS. 7A and 7B illustrate directivity axes of the speaker if the location of the listener changes up and down, and FIG. 7A shows the directivity axes in the horizontal direction and FIG. 7B shows the directivity axes in the vertical direction. In FIG. 7A, the listener P0 is the center location (in which speaker characteristics are optimal) of a directivity axis 301 of the speaker, and the listeners P1 and P2 are positions shifted from the center of the directivity axis 301 due to up and down movement of the listeners. Further, as shown in FIG. 7B, even if the location of the listener moves up and down, there is no change in the side glass 210 in the vertical direction and, consequently, only the angle of elevation needs to be adjusted.

Figure 8:
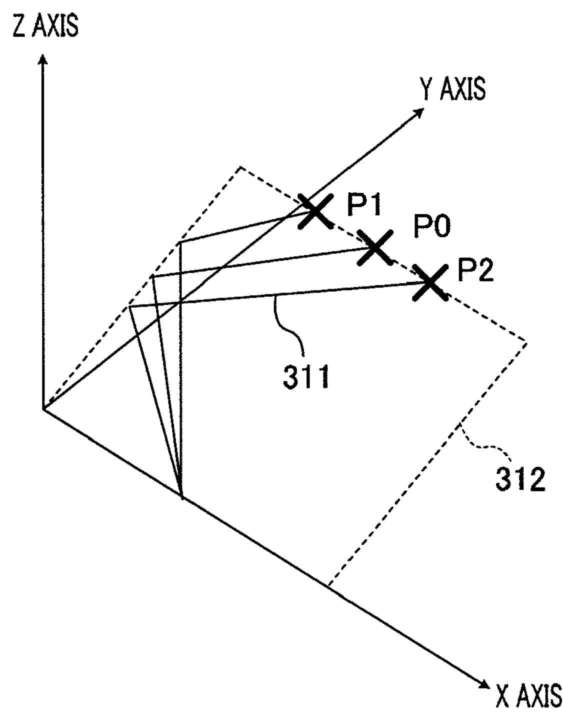
FIG. 8 is a perspective view of the relationship between the positions of the speaker unit and the listener in case that the position of the listener of the speaker system according to above Embodiment 1 changes right and left.

FIG. 8 is a perspective view illustrating the relationship between the positions of the speaker unit and the listener if the location of the listener changes right and left. The symbols P0 to P2 in the figure represent the positions of the listener, and P0 represents the original location of the listener, and P1 and P2 represents the positions of the listener if the listener moves right and left. In FIG. 8, if the position of the listener changes right and left (i.e. X axis direction), the shortest path 311 that connects the speaker and P0, P1 and P2 by reflection through the side glass (Y axis direction) is formed on a plane 312 encircled by the broken line of FIG. 8, and so the angle of elevation does not change.

[Method of Adjustment]

The shift in the null plane, the change in the directivity axis of the speaker, the change in the path length and the change in the difference between the right and left paths, which are mentioned above, are adjusted by operations of the speaker and speaker unit (i.e. driving system by means of driving motors). The operations of the speaker and speaker unit include the operations for adjusting "rotation," "opening angle," "difference of angles of elevations" and "angle of elevation." Further, a change in the sound volume and sound volume difference that cannot be adjusted by the operations of the speaker and speaker unit, are adjusted by signal processing in the speaker (i.e. signal processing system by means of the sound processing section 141). In other words, a change in the sound volume and the sound volume difference that are left after adjustment by the operations of the speaker and speaker unit, are adjusted by signal processing of the speaker.

First, adjustment of "rotation," "opening angle," "difference of angles of elevation" and "angle of elevation" will be described.

FIGS. 9A to 9D are schematic views illustrating operations of the speaker and speaker unit. The speaker unit SP1 is employed as an example, the same applies to the speaker unit SP2.

Figure 9A:
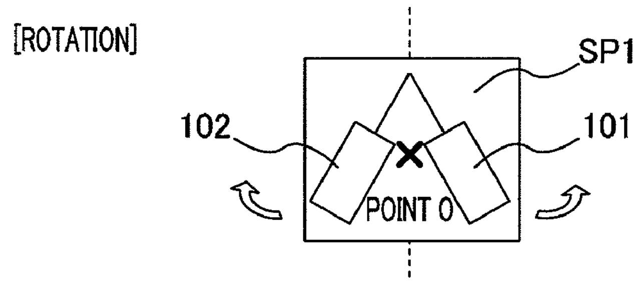
FIG. 9 is a schematic view illustrating operations of speakers and speaker units of the speaker system according to above Embodiment 1.

As shown in FIG. 9A, the "rotation" adjustment is directed to rotating the speaker unit SP1 entirely to the right or to the left with respect to a point O. The direction of the null plane in which silence is generated in theory, can be changed by a driving motor 712 (see FIG. 20).

Figure 9B:
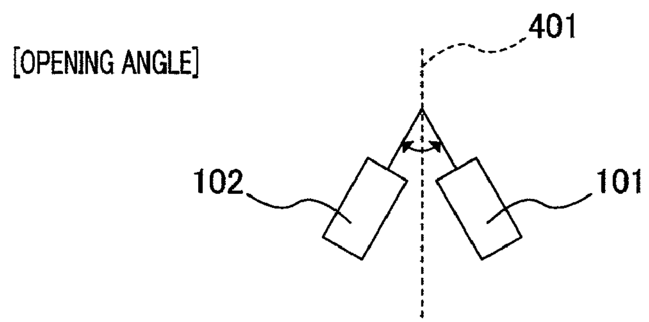

As shown in FIG. 9B, in the "opening angle" adjustment, by driving the driving motor 111 to widen or narrow the angles between the directivity axes of the first R channel speaker 101/the second R channel speaker 102 and a reference plane 401 while maintaining the plane symmetry with respect to the reference plane 401, it is possible to change the path and the angle through which sound is reflected by the side glass and reaches the listener.

Figure 9C:
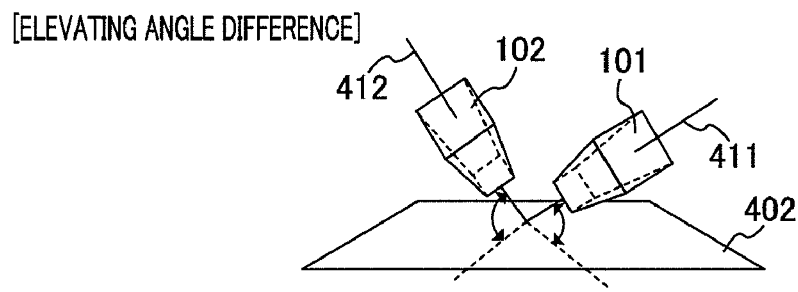

As shown in FIG. 9C, the "difference of angles of elevations" refers to the difference between the angles (hereinafter "angles of elevations") of an directivity axis 411 of the first R channel speaker 101 of the speaker unit SP1 and an directivity axis 412 of the second R channel speaker 102 of the speaker unit SP1 with respect to a horizontal plane 402. The "difference of angle of elevation" is adjusted by driving the speaker by the driving motor 112 and the null plane is inclined a predetermined angle from 90 degrees with respect to the horizontal plane 402, so that it is possible to change the direction of the null plane. Only the above method of using the "rotation" adjustment and this method of using the "difference of angle of elevation" adjustment can change the direction of the null plane. With the present embodiment, the direction of the null plane is adjusted using the "difference of angle of elevation" adjustment and is adjusted using the "rotation" adjustment with Embodiment 2 (described later). Further, the control of the null plane by the adjustment as to difference of angle of elevation is a little complicated and therefore description will be added using FIGS. 11 to 14.

Figure 9D:
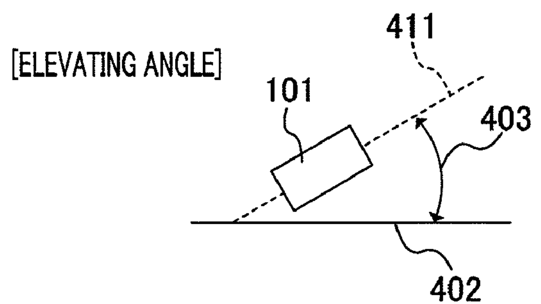

As shown in FIG. 9D, in the "angle of elevation" adjustment, by widening or narrowing angle of elevations 403 of the first R channel speaker 101 and the second R channel speaker 102 with respect to the horizontal plane 402 while maintaining the angle of elevation difference between an directivity axis 411 of the first R channel speaker 101 of the speaker unit SP1 and an directivity axis 412 (not shown in FIG. 9D) of the second R channel speaker 102 of the speaker unit SP1, it is possible to change the path and the angle through which sound is reflected by the side glass and reaches the listener. The speaker unit SP1 is entirely driven by the driving motor 113 as a method of changing the angle of elevation while maintaining the above difference of angle of elevation.

FIG. 10 shows a table of control content of "rotation," "opening angle" and "angle of elevation" corresponding to a change in the location of the listener (i.e. the location of the head) employing the listener P1 in the driver's seat (i.e. right seat) as an example. Further, FIG. 10 shows an example where the direction of the null plane is controlled using the "rotation," and so the "difference of angle of elevation" is not shown.

In FIG. 10, if, for example, the location of the listener moves "to the front" from the original location, control is carried out such that the rotation is made to the "left," the opening angle is "widened" and the angle of elevation is "widened." Similarly, if the location of the listener moves "to the back" from the original location, control is carried out such that the rotation is made to the "right," the opening angle is "narrowed" and the angle of elevation is "narrowed." Further, in case of the listener P2 in the front passenger seat (i.e. left seat), the case of the listener P1 is reversed.

[Control of the Null Plane by the Angle of Elevation Difference Adjustment]

Next, referring to FIG. 11 to FIG. 14, control of the null plane by the angle of elevation difference adjustment will be described.

1. Regarding Generation of the Null Plane

Figure 11:
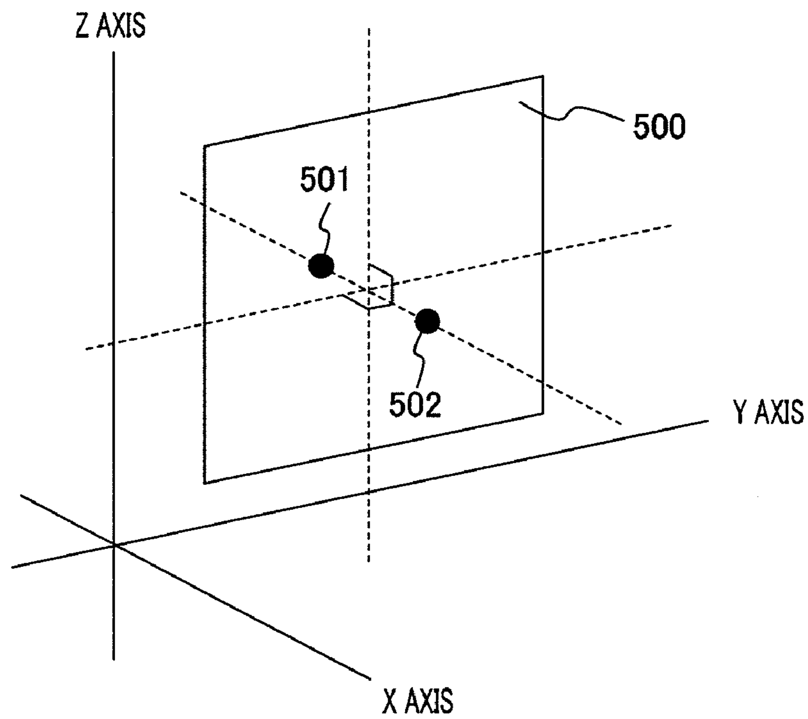
FIG. 11 is a diagram illustrating a null plane formed on a plane at equal distances from two sound sources of the speaker system according to above Embodiment 1.
Figure 12:
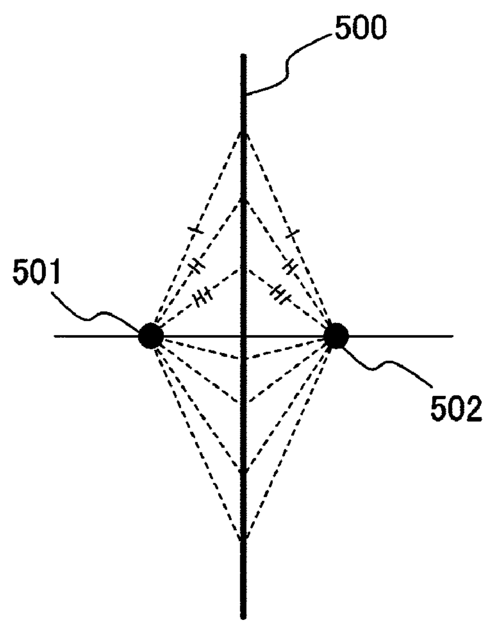
FIG. 12 is a diagram illustrating a null plane formed on a plane at equal distances from two sound sources of the speaker system according to above Embodiment 1.

FIG. 11 and FIG. 12 illustrate the null plane formed in a certain plane at equal distances from two sound sources, and FIG. 11 is a three-dimensional view of the null plane and FIG. 12 is a two-dimensional view of the null plane.

In FIG. 11 and FIG. 12, if sounds having opposite phases from one another are outputted from two point sound sources 501 and 502, sound pressure is equal between places at equal distances from both the sound sources 501 and 502 and sound waves of opposite signs arrive and sound from two sound sources cancel each other in such a place thereby generating silence. Further, a plane in which points at equal distances from both the sound sources 501 and 502 are collected becomes a vertical bisector plane of lines connecting the two sound sources 501 and 502. A plane in which sounds from the two sound sources 501 and 502 cancel each other in this way thereby generating silence, is defined as a null plane 500.

Figure 13A:
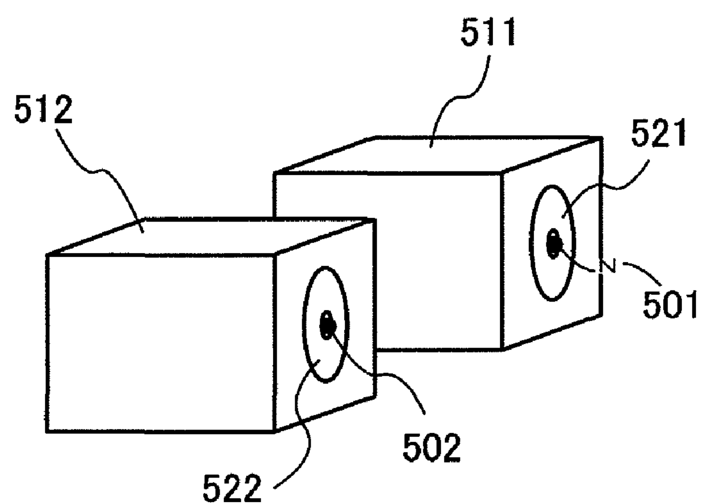
FIG. 13 is a diagram illustrating a null plane of speakers in a state where there is no difference as to angle of elevation in the speaker system according to above Embodiment 1.
Figure 13B:
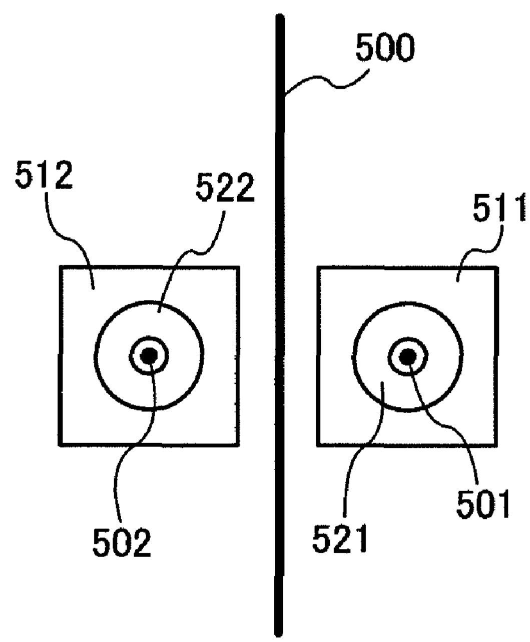
Figure 14A:
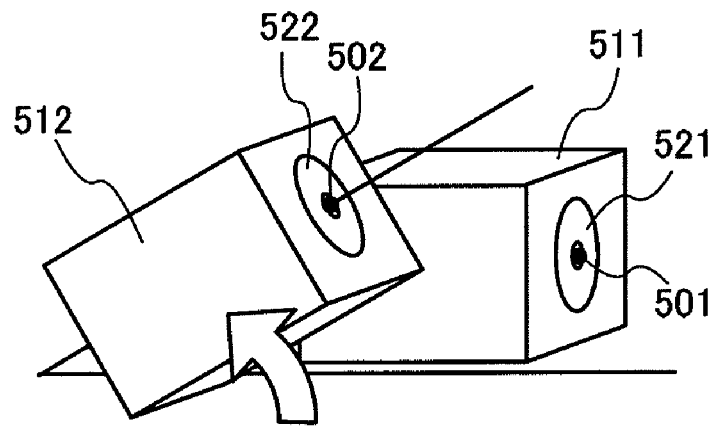
FIG. 14 is a diagram illustrating a null plane of speakers in a state where there is a difference of angle of elevation in the speaker system according to above Embodiment 1.
Figure 14B:
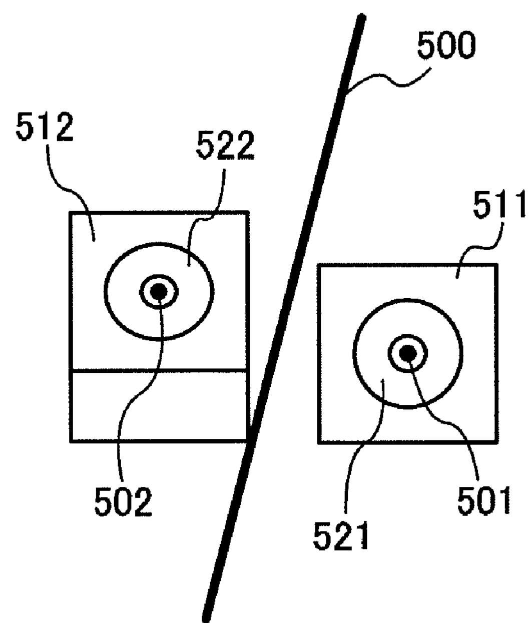

2. Displacement of Sound Source by Changing the Difference of Angle of Elevation FIGS. 13A and 13B illustrate the null plane of the speakers due to the difference of angle of elevation in a state of no difference of angle of elevation, and FIG. 13A is a perspective view of the speakers and FIG. 13B is a front view of the speakers. FIGS. 14A and 14B illustrate the null plane of the speakers due to the difference of angle of elevation in a state where the difference of angle of elevation exists, and FIG. 14A is a perspective view of the speakers and FIG. 14B is a front view of the speakers.

In FIG. 13 and FIG. 14, if the above speakers 511 and 512 are typical dynamic speakers, the center of a speaker corn 521 included in the speaker 511 becomes a virtual point sound source 501. Further, the center of a speaker corn 522 included in the speaker 512 which makes a pair with the speaker 511 becomes a virtual point sound source 502. In the speaker system 100 in FIG. 1 and FIG. 2, the speaker 511 and the speaker 512 correspond to the first R channel speaker 101 and the third L channel speaker 103, and the second L channel speaker 102 and the fourth L channel speaker 104, respectively.

Further, as shown in FIG. 13, if signals having opposite phases from each other are outputted at the same time in a state of no difference of angle of elevation, the null plane 500 is formed in the vertical bisector plane with respect to the line connecting the point sound source 502 which is the center of the speaker corn 522 and the point sound source 501 which is the center of the speaker corn 521. If the difference of angle of elevation as shown in FIG. 14 is provided by applying the angle of elevation to the speaker 512 which is one of the speakers in the state of FIG. 13, the location of the point sound source 502 which is the center of the speaker corn 522 moves up. By this means, as shown in FIG. 14B, the vertical bisector plane of the line connecting the point sound source 502 and point sound source 501 which is the center of the speaker corn 521 inclines consequently, so that it is possible to incline the null plane 500. In this way, the inclination of the null plane 500 can be changed by the difference of angle of elevation between the two speakers 511 and 512, and the first listening position and the second listening position can be placed on the null plane 500 by changing the inclination. Further, although the null plane 500 can be changed by rotating speaker units, adjustment of the null plane 500 by rotation is carried out not by inclining the null plane 500 but by moving the null plane 500 while maintaining the vertical state where a speaker unit is used as the axis.

[Correction of the Path Length Based on the Phase Difference]

Next, correction of the path length based on the phase difference will be described.

Figure 15:
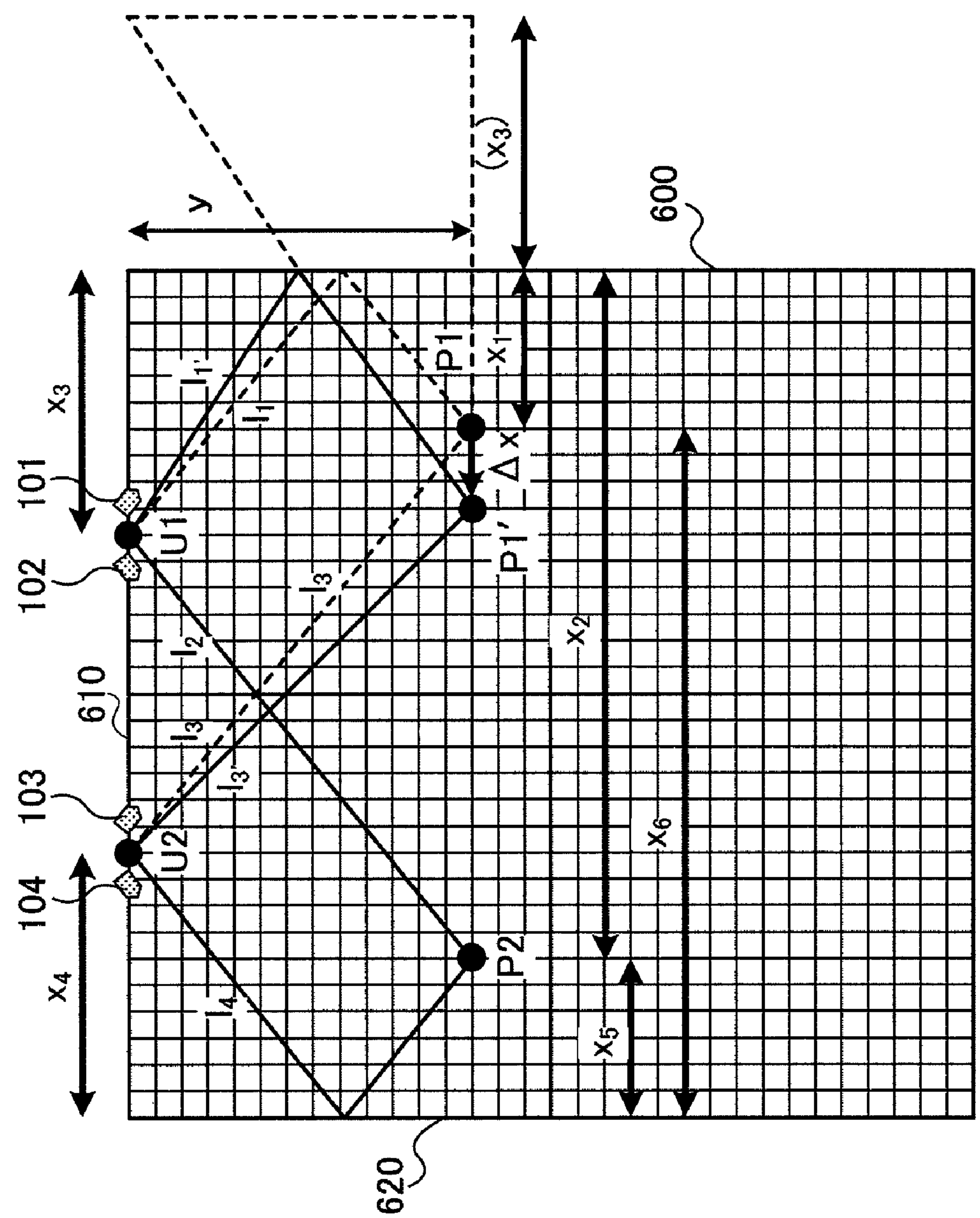
FIG. 15 is a diagram illustrating correction of the path length due to the phase difference in the speaker system according to above Embodiment 1.

FIG. 15 illustrates correction of the path length based on to the phase difference. The symbols P1 and P2 in the figure represent the positions of listeners, the symbol P1' represents the location of the listener P1 after leftward movement, the symbols U1 and U2 represent the positions where the speaker units SP1 and SP2 are arranged. Further, in the speaker system 100 of FIG. 1, a reflecting plane 600 and a reflecting plane 620 correspond to the side glasses 210 and 220.

1. In Case the Listener P1 Moves Right and Left

Although the distance $l_1$ from U1 to P1 and the distance $l_2$ from U2 to P1 are equal at the point P1, the difference is produced between the distance $l_1$ and the distance $l_2$ to P1' after movement. Here, the symbol $l_1'$ refers to the distance through which the sound outputted from the speaker unit SP1 is reflected by the reflecting plane 600 and reaches P1' from the location U1 after movement, and the symbol $l_2'$ refers to the distance through which the sound outputted from the speaker unit SP2 reaches P1' from the location U2 directly. The relational equation of the difference ΔL between $l_1'$ and $l_2'$ is as follows.

$$l_1' = \sqrt{\left(\frac{x_1 + x_2}{2} + \Delta x\right)^2 + y^2} \quad \text{(Equation 6)}$$

$$l_3' = \sqrt{\left(\frac{x_2 + x_1}{2} - \Delta x\right)^2 + y^2} \quad \text{(Equation 7)}$$

$$\Delta L = l_1' - l_3' = \sqrt{\left(\frac{x_1 + x_2}{2} + \Delta x\right)^2 + y^2} - \sqrt{\left(\frac{x_2 + x_1}{2} - \Delta x\right)^2 + y^2} \quad \text{(Equation 8)}$$

The sign of Δx in the above equations 6 to 8 is positive in the left direction in FIG. 15.

2. Regarding Derivation of the Above Equations 6 to 8

The positions P1 and P2 are spaced apart from the plane 610 by the distance y.

The positions P1 and P2 are located spaced apart from the reflecting plane 600 by the distance $x_1$ and the distance $x_2$, respectively.

Further, the distance $x_3$ from the reflecting plane 600 of U1, which is equal to the distance $l_1$ through which sound is reflected by the reflecting plane 600 and reaches P1 from U1 and the distance $l_3$ connecting U2 and P1 directly, is represented by the following equation 9.

$$x_3 = \frac{x_2 - x_1}{2} \quad \text{(Equation 9)}$$

Similarly, the distance $x_4$ from reflecting plane 620 of U2, which is equal to the distance $l_4$ through which sound is reflected by the reflecting plane 620 and reaches P2 from U2 and the distance $l_2$ connecting U1 and P2 directly, is represented by the following equation 10. Further, in the following equation 10, the symbol $x_5$ represents the distance between P2 and the reflecting plane 620, and the symbol $x_6$ represents the distance between P1 and the reflecting plane 620.

$$x_4 = \frac{x_6 - x_5}{2} \quad \text{(Equation 10)}$$

To make the distances $l_2$ and $l_3$ equal, the following equation 13 needs to be satisfied. The following equations 11 and 12 for deriving the equation 13 use the above-described equations 9 and 10.

from $l_2=\sqrt{(x_2-x_3)^2+y^2}$ and Equation 9, $$l_2 = \sqrt{\left(\frac{x_2 + x_1}{2}\right)^2 + y^2} \quad \text{(Equation 11)}$$

from $l_3=\sqrt{(x_6-x_4)^2+y^2}$ and Equation 10, $$l_3 = \sqrt{\left(\frac{x_6 + x_5}{2}\right)^2 + y^2} \quad \text{(Equation 12)}$$

if $l_2=l_3$ is solved, $$x_2+x_1=x_6+x_5 \quad \text{(Equation 13)}$$

Further, given that the distance between P1 and P2 does not change, the following equation 14 holds.

$$x_6-x_5=x_2-x_1 \quad \text{(Equation 14)}$$

Consequently, the following relational equations 15 and 16 are obtained from the above equations 13 and 14.

$$x_5=x_1 \quad \text{(Equation 15)}$$

$$x_6=x_2 \quad \text{(Equation 16)}$$

On the other hand, if, as to the point P1' shifted by Δx from P1, the distance through which sound is reflected by the reflecting plane 600 and reaches P1' from U1, is the distance $l_1'$ and the distance connecting U2 and P1' directly is the distance $l_3'$, the following relational equations hold.

from $l_1'=\sqrt{(x_1+x_3+\Delta x)^2+y^2}$ and Equation 9, $$l_1' = \sqrt{\left(\frac{x_1+x_2}{2}+\Delta x\right)^2+y^2}$$

from $l_3'=\sqrt{(x_6-x_4-\Delta x)^2+y^2}$ and Equations 10, 15 and 16, $$l_3' = \sqrt{\left(\frac{x_2+x_1}{2}-\Delta x\right)^2+y^2}$$

Consequently, the difference ΔL between the distance $l_1'$ to P1' that moved by the distance ΔX in the X direction from P1 and the distance $l_3'$ is represented by the following relational equation.

From $\Delta L=l_1'-l_3'$, $$\therefore \Delta L = \sqrt{\left(\frac{x_1+x_2}{2}+\Delta x\right)^2+y^2} - \sqrt{\left(\frac{x_2+x_1}{2}-\Delta x\right)^2+y^2}$$

that is, the Equation 8 is determined.

3. Correction of Shifts in Arrival Times Due to Generation of the Distance Difference If, in P1', there is the difference between the distance $l_1'$ through which sound is reflected by the reflecting plane 600 and reaches P1' from U1 and the distance $l_3'$ connecting U2 and P1' directly, sound outputted from U1 (for example, Rch speech) and sound outputted from U2 (for example, Lch speech) does not arrive at the same time, which produces a shift. The time ΔT [second] which shifts in this case is determined as in the following equation 17 based on the path difference ΔL [m] and sound speed S [m/s]. Further, ΔL has a sign, and ΔT has a sign.

$$\Delta T=\Delta L/S\text{[second]} \quad \text{(Equation 17)}$$

Consequently, to correct this shift ΔT, only sound outputted from the first R channel speaker 101 needs to be set by ΔT [second] ahead of sound outputted from other speakers (from the second R channel speaker 102 to the fourth L channel speaker 104) or sound outputted from other speakers (from the second R channel speaker 102 to the fourth L channel speaker 104) needs to be set by ΔT [second] back of sound outputted from the first R channel speaker 101.

The factors of the adjusting methods if the location of the listener changes has been described. A case will be described below where these methods of adjustment are applied to the actual speaker system 100 (FIG. 1). With the present embodiment, the adjustment is carried out according to the conditions shown in FIG. 16 and FIG. 17.

Figure 16A:
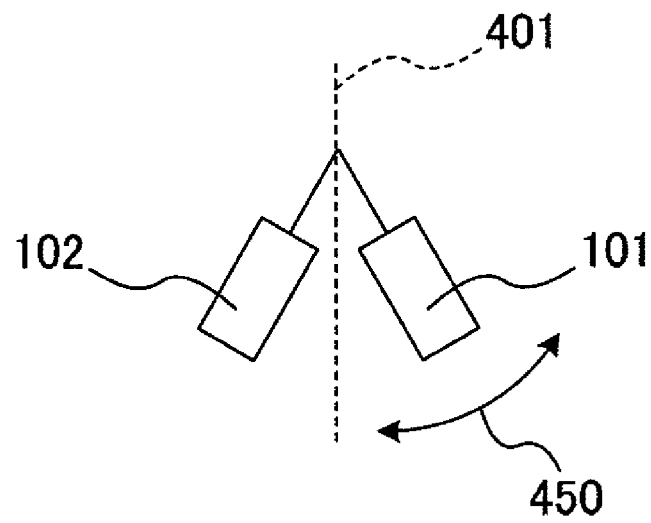
FIG. 16 is a schematic view illustrating an adjusting method of applying the speaker system according to above Embodiment 1.
Figure 16B:
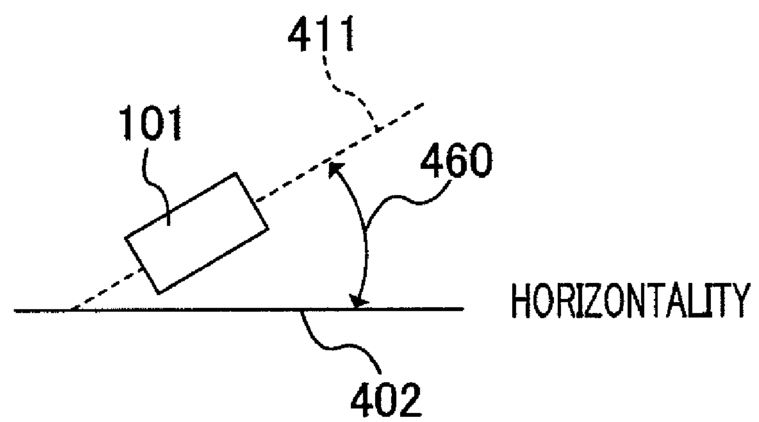

FIGS. 16A and 16B are schematic views illustrating methods of the adjustment applied to the speaker system 100 and FIG. 17 shows a table of control content of the phase differences in the location of the listener (i.e. the location of the head). The same components as in FIG. 9 are assigned the same reference numerals.

(1) With the speaker system 100 of the present embodiment, the shift in the null plane in which silence is generated in theory is adjusted by not using the "rotation" adjustment of rotating the entire speaker unit but using the "difference of angle of elevation" adjustment for the speaker as described in detail in FIG. 13 and FIG. 14.

(2) With the speaker system 100 of the present embodiment, instead of adjusting the "opening angle" by widening or narrowing the angle with respect to the reference plane 401 while maintaining the plane symmetry with respect to the reference plane 401 shown in FIG. 9, an "opening angle A 450" for adjusting with respect to the reference plane 401 only the opening angle of the first R channel speaker 101 which is one of the speakers, is controlled as shown in FIG. 16A. For Lch, only the opening angle of the fourth L channel speaker 104 is adjusted in the same way.

(3) In the speaker system 100 of the present embodiment, an "angle of elevation B460" for adjusting the angle of elevation of the overall speaker unit is controlled as shown in FIG. 16B.

Consequently, the angle of elevation B460 of the overall speaker units SP1 and SP2 are controlled by the driving motors 113 and 123. Further, the difference of angle of elevation between the first R channel speaker 101 and the second R channel speaker 102 installed in the speaker unit SP1 and the difference of angle of elevation between the third L channel speaker 103 and the fourth L channel speaker 104 installed in the speaker unit SP2 are controlled by the driving motors 112 and 122, respectively.

In this way, with the present embodiment, only the opening angle A450 and the angle of elevation B460 are adjusted. By employing the method of adjusting only the opening angle A450 and the angle of elevation B460, it is possible to reduce complexity of the mechanism and decrease cost. Further, it is more effective to adjust the opening angle and adjust paths through which sounds are reflected by the side glasses 210 and 220 than to adjust the null plane in which silence is generated in theory by rotation.

With the present embodiment, the inclination of the null plane in which silence is generated by providing the difference of angle of elevation, is controlled. Consequently, if the operation is limited as in the actual system, the null plane in which silence is generated in theory by slightly shifting the angle of elevation B460 up or down with respect to the listener and adjusting the differences of angles of elevations according to the table shown in FIG. 17, is adjusted such that the null plane matches the location of the listener. In this case, if the listener is positioned on the directivity axis of the speaker unit, an attention must be paid because the null plane in which silence is generated cannot be adjusted by providing the difference of angle of elevation. Further, as to the definitions of positive and negative of the difference of angle of elevation in the table of FIG. 17, "positive" means that the angle of elevation of the outer speaker 101 or 104 is greater than the angle of elevation of the inner speaker 102 or 103, and "negative" means that the angle of elevation of the outer speaker 101 or 104 is smaller than the angle of elevation of the inner speaker 102 or 103.

Figure 18:
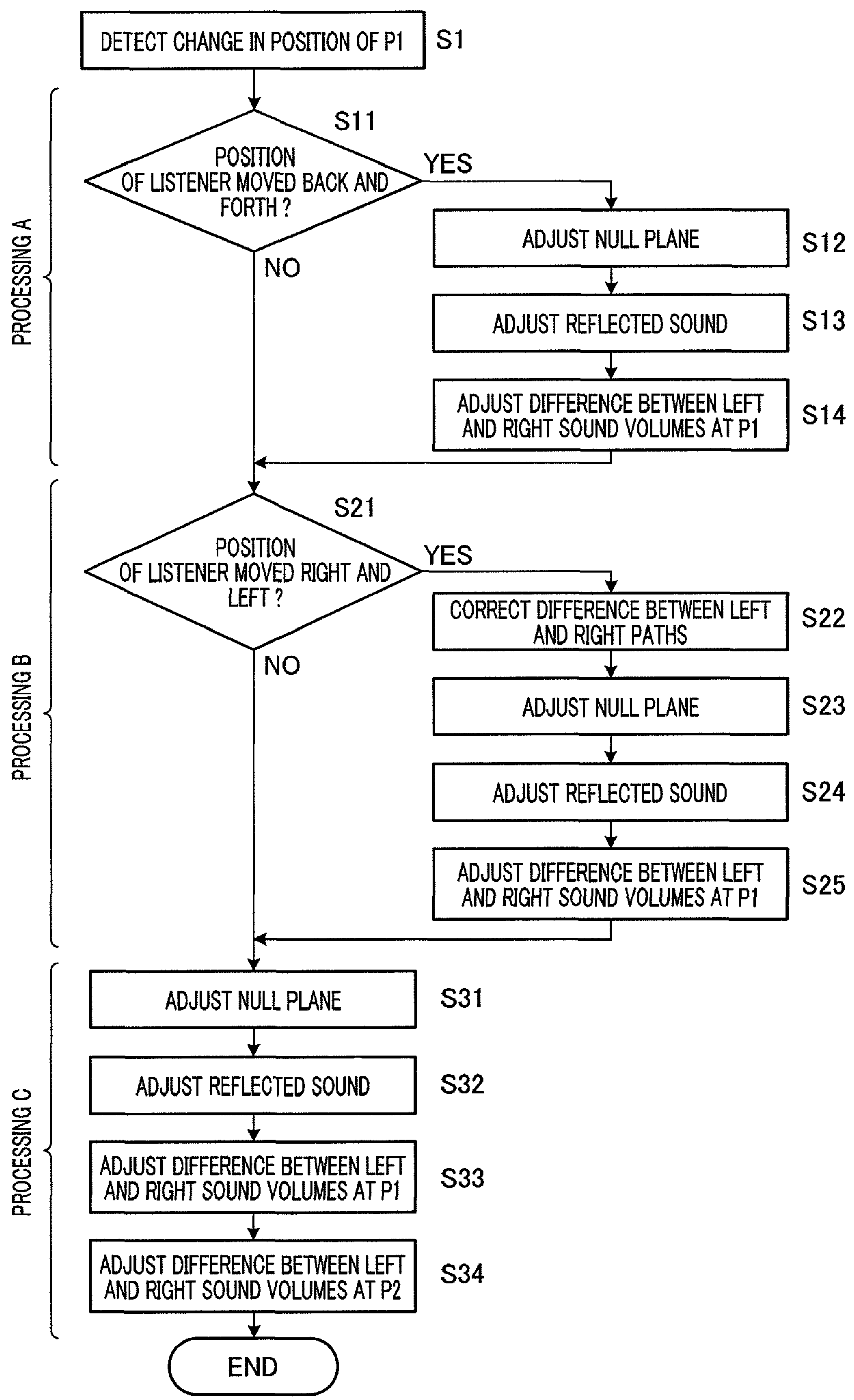
FIG. 18 is a flowchart illustrating automatic adjustment processing of the speaker system according to above Embodiment 1.

FIG. 18 is a flowchart showing automatic adjustment processing in the speaker system 100. This flow is executed repeatedly by the CPU in the controlling section 150 at a predetermined cycle. Further, although this flow employs an, example of movement in the location of the listener P1, the same adjustment processing is executed with respect to movement in the location of the listener P2.

This program starts following the change in the location of the listener P1 (step S1), whether or not the location of the listener P1 moved back and forth is decided in step S11. The movement in the location of the listener P1 is decided by acquiring head location information of the listener from the position detecting section 160 (see FIG. 2). A typical example where the listener P1 moves back and forth is a case where the listener P1 moves the seat to the front or to the back or changes the reclining angle of the seat. Further, although it is difficult to detect right and left movement in the location of the listener P1 (described later) only by signals from the contact switches 161 and 162 installed in the seat, this movement can be detected by, for example, increasing contact switches in the back of the seat. Further, it is possible to acquire head location information of the listener more accurately using a location detecting means of a camera that takes an image of the vicinity of the listener's head and an image processing section, instead of detecting positions of contact switches. Further, if the listener P1 is the driver in the driver's seat, the right and left movement seems little likely. Further, oblique movement involves movement in the front-back position, and is categorized as movement of the front-back position.

If the location of the listener P1 moved back and forth in the above step S11, the null plane is adjusted in step S12. The controlling section 150 carries out an arithmetic operation for adjusting the null plane for placing the null plane above the location of the listener P1 based on the amount of movement in the front-back position of the listener P1, converts the arithmetic operation result into control parameters and outputs the control parameters to the motor driver section 130. The motor driver section 130 drives an applicable driving motor (herein, driving motor 112) to reach the target value based on control commands from the controlling section 150. Although, as described above, there are two methods of carrying out the "rotation" and changing the "difference of angle of elevation" to adjust the null plane, the null plane is adjusted by changing the difference of angle of elevation with the present embodiment. The controlling section 150 transmits to the motor driver section 130 the control commands for controlling opening angles, differences of angles of elevations and angles of elevations of the speakers 101 to 104 and speaker units SP1 and SP2. By supplying the target value showing the "difference of angle of elevation" from these control commands, the motor driver section 130 drives the driving motor 112 to a predetermined amount, provides a difference of angle of elevation between the directivity axis of the first R channel speaker 101 and the directivity axis of the second R channel speaker 102 and inclines the null plane (see FIG. 14), so that it is possible to place the null plane in the location to which the listener P1 moves.

Next, by changing the opening angle in the speaker unit SP1 in step S13, reflected sound is adjusted such that quality of sound that is reflected and reaches the listener P1 improves. The decision criterion for this adjustment includes sound pressure, distortion and frequency characteristics. The controlling section 150 stores as a table the relationship between the location of the listener P1 and the opening angle at which the reflected sound is heard the best for the listener P1 and changes the opening angle referring to this table. Adjusting of the opening angle according to the present embodiment is directed to adjusting only the opening angle of the first R channel speaker 101 shown in FIG. 16. The motor driver section 130 adjusts the reflected sound by driving the driving motor 111 to a predetermined amount and changing the opening angle of the first R channel speaker 101. By means of the above processings, as in the case of the change to the back and forth shown in FIG. 5, the null plane is adjusted and the reflected sound is adjusted.

Next, the difference between right and left sound volumes is adjusted in the location of the listener P1 in step S14, and the flow proceeds to step S21. Although the adjustment of the reflected sound (Rch in this description) is finished by controlling the above opening angle, given that the reflected sound (Rch) is adjusted, it is necessary to adjust direct sound (Lch) corresponding to the reflected sound (Rch). Then, by changing the sound volume of the third L channel speaker 103, the right and left sound volumes are adjusted to be the same. The controlling section 150 outputs control commands for controlling the output volumes and the phases of the output sounds of the speakers 101 to 104, to the sound processing section 141. The controlling section 150 outputs the control commands for changing the sound volume of the third L channel speaker 103 to the sound processing section 141 to change the sound volume of the third L channel speaker 103 and adjust the sound volumes of the right and left speakers to be the same.

Processings in the above step S11 to step S14 are referred to as "processing A".

If the location of the listener P1 did not move back and forth in the above step S11 or after the processing of the above step S14 is carried out, whether or not the location of the listener P1 moved right and left is decided in step S21. If the location of the listener P1 moved right and left, the difference between the right and left paths is corrected in step S22. To be more specific, the difference between the right and left paths is adjusted by setting the phase of the sound outputted from the first R channel speaker 101 composing the speaker unit SP1 ahead or back of phases of the sounds outputted from the other speakers 102 to 104. As shown in FIG. 6, if the location of the listener P1 changes right and left, the right and left path lengths from the speakers to the listener P1 significantly change, thereby producing a difference between the right and left paths. The difference between the right and left paths produces a difference between the times the right and left sounds arrive and a shift in the right and left sounds. In this step S22, the difference between the right and left paths is adjusted by changing the phases of the output sounds.

Next, the null plane is adjusted in step S23. The method of adjustment is the same as in the case of the above step S12. However, in case of change to the right and left, as shown in FIG. 6, the null plane moves significantly right and left compared to the case of change to the back and forth, and so the null plane needs to be adjusted significantly.

Next, by changing the opening angle in the speaker unit SP1 in step S24, reflected sound is adjusted such that quality of sound that is reflected and reaches the listener P1 improves. The method of adjustment is the same as in the case of the above step S13.

Next, the difference between the right and left sound volumes in the location of the listener P1 is adjusted in step S25, and the flow proceeds to step S31. The method of adjustment is the same as in the case of the above step S14.

Processings of the above step S21 to step S25 are referred to as "processing B".

If the location of the listener P1 did not move right and left in the above step S21 or after processing of the above step S25 is carried out, the null plane is adjusted in step S31. The method of adjustment is the same as in the case of the above step S12. The amount of adjustment of the null plane is little in this case.

Next, by changing the opening angle in the speaker unit SP1 in step S32, reflected sound is adjusted such that quality of sound that is reflected and reaches the listener P1 improves. The method of adjustment is the same as in the case of the above step S13.

Next, this flow is finished by adjusting the difference between the right and left sound volumes in the location of the listener P1 in step S33 and adjusting the difference between the right and left sound volumes in the location of the listener P2 in step S34. If the location of the listener P1 moves up and down, a shift is produced with respect to the listener P1 between the directivity axes of one speaker that has been adjusted (the first R channel speaker 101) and the other speaker (the third L channel speaker 103). In step S33, this difference between the right and left sound volumes is adjusted such that the sound volumes of the right and left channels are the same for the listener P1, by changing the sound volume of the inner speaker (the third L channel speaker 103) of the speaker unit SP2. Similarly, in step S34, the difference between the right and left sound volumes is adjusted such that the sound volumes of the right and left channels are the same for the listener P2, by changing the sound volume of the inner speaker (the second L channel speaker 103) of the speaker unit SP1.

Processings of the above step S31 to step S34 are referred to as "processing C".

The order to execute the above processings A, B and C can be switched. Further, the timing to execute this flow is arbitrary. For example, the program may be started if the location of the listener changes more than a predetermined distance and may be executed at all times and adjustment may be carried out in real time processing. Further, an embodiment is possible where the flow is automatically executed if the listener is seated, sound is inputted or an audio device is energized. It naturally follows that the flow may be executed by a command of the listener.

As described above in detail, according to the present embodiment, the speaker system 100 has: the first speaker unit SP1 that includes the first R channel speaker 101 outputting sound to be heard in the first listening position and the second R channel speaker 102 outputting sound to be heard in the second listening position; the second speaker unit SP2 that includes the third L channel speaker 103 outputting sound to be heard in the first listening position and the fourth L channel speaker 104 outputting sound to be heard in the second listening position; the driving motors 111 to 113 and 121 to 123 that drive at least the first R channel speaker 101 such that the current first listening position is practically included in the vertical bisector plane of the line connecting the intersection of the first R channel speaker 101 and the directivity axis of the first R channel speaker 101 and the intersection of the second R channel speaker 102 and the directivity axis of the second R channel speaker 102, and that drive at least the fourth L channel speaker 104 such that the current second listening position is practically included in the vertical bisector plane of the line connecting the intersection of the third L channel speaker 103 and the directivity axis of the third L channel speaker 103 and the intersection of the fourth L channel speaker 104 and the directivity axis of the fourth L channel speaker 104; and the motor driver section 130 that drives the driving motors 111 to 113 and 121 to 123. With this configuration, even if the location of the listener moves back and forth, right and left or up and down, the speaker system 100 is able to automatically adjust at least such as directions of the speakers 101 to 104 to be suitable for the current listening position. By this means, it is possible to realize a speaker system that is able to provide a listening environment which does not give a sense of discomfort to a plurality of listeners. That is, in an environment in which there are two listeners in the passenger compartment of the vehicle, it is possible to produce excellent effects at the same time that (1) the sound image is fixed in the front, (2) wide stereo sound can be provided and (3) sound of the R channel and sound of the L channel arrive at the same time, for the two listeners, so that an optimal acoustic environment can be realized.

Further, with the present embodiment, the direction of the null plane in which silence is generated in theory is adjusted using the angle of elevation difference between the first R channel speaker 101 and the second R channel speaker 102 and the angle of elevation difference between the third L channel speaker 103 and the fourth L channel speaker 104, so that it is possible to fixedly install the second R channel speaker 102 and the third L channel speaker 103 and produce an effect of changing the direction of the null plane at lower cost.

Embodiment 2

An example has been described with Embodiment 1 where the shift in the null plane in which silence is generated in theory is adjusted using the "differences of angles of elevations" between speakers. With the present embodiment, the shift in the null plane is adjusted by "rotating" the entire speaker unit. Further, more precise adjustment is possible by adjusting the shift in the null plane by "rotating" the entire speaker unit.

Figure 19:
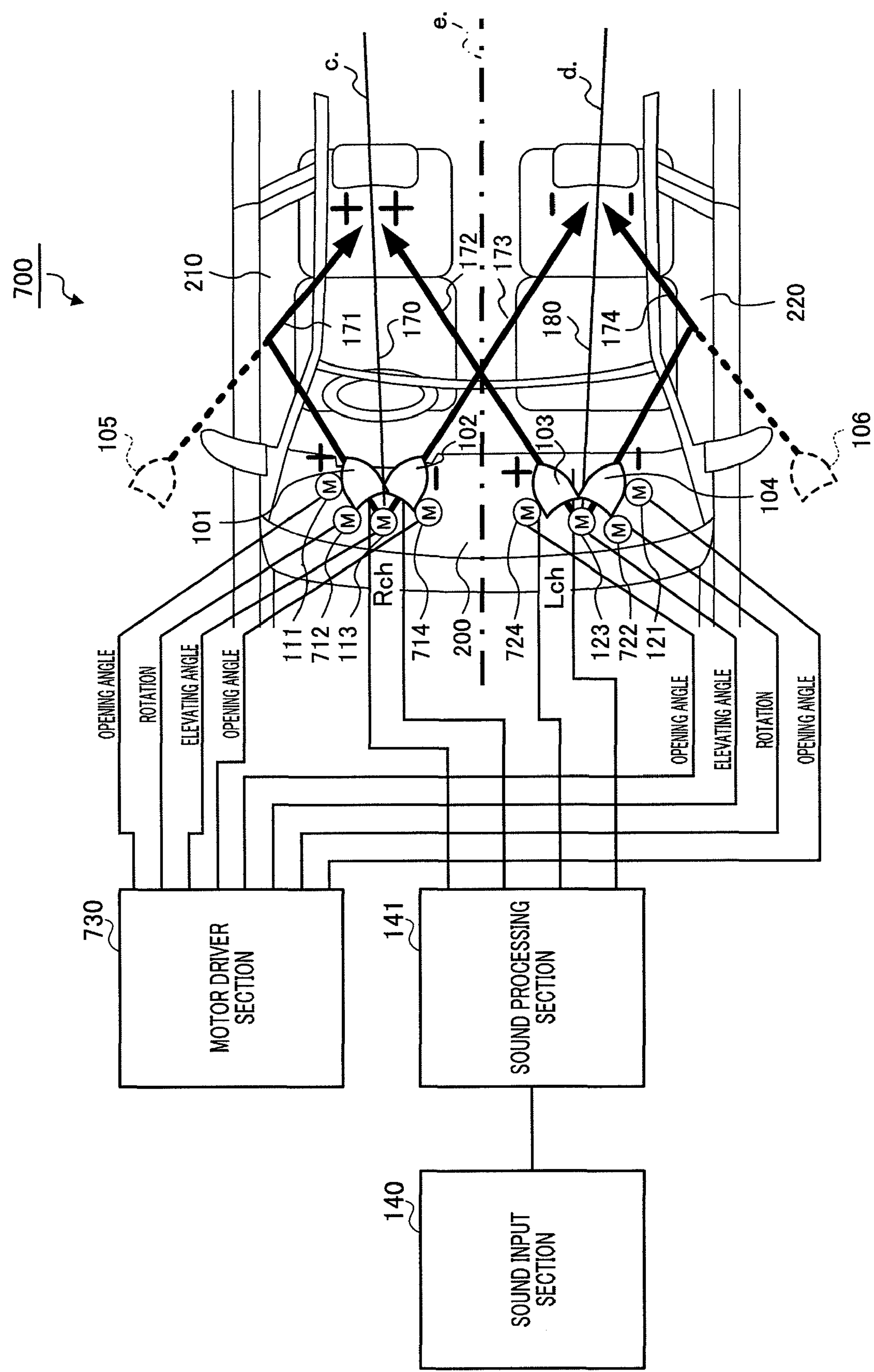
FIG. 19 is a diagram illustrating from above the interior of a vehicle mounting the speaker system according to Embodiment 2 of the present invention.
Figure 20:
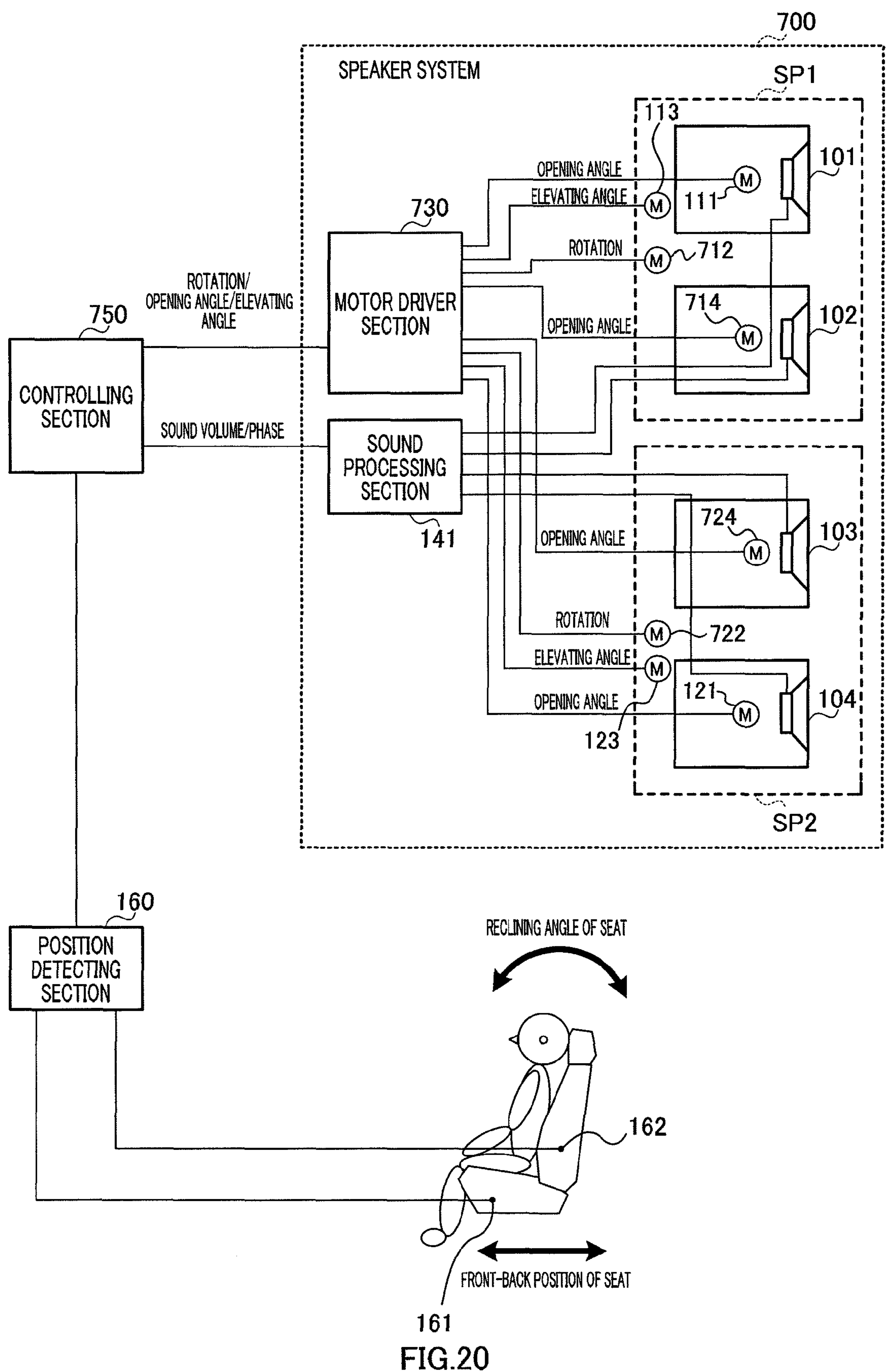
FIG. 20 is a diagram illustrating the overall configuration of the speaker system according to above Embodiment 2.

FIG. 19 is a schematic view showing from above a speaker system 700 according to Embodiment 2 of the present invention and the interior of the vehicle mounting the speaker system 700, and FIG. 20 is a block diagram showing the speaker system 700 shown in FIG. 19 and configurations around the speaker system 700. Upon description of the present embodiment, the same parts as in FIG. 1 and FIG. 2 will be assigned the same reference numerals and repetition of description will be omitted.

In FIG. 19 and FIG. 20, the speaker system 700 has: a motor driver section 730 that drives driving motors 111, 121, 714 and 724 for changing opening angles, driving motors 712 and 722 for changing rotation of the speaker units SP and driving motors 113 and 123 for changing angles of elevations of speaker units SP; and a sound processing section 141 that carries out signal processing of a 2-channel (i.e. L channel and R channel) signal from a sound input section 140 to which the sound source composed of the 2-channel signal is inputted and generates the in-phase signal (R), the reverse phase signal (R), the in-phase signal (L) and the reverse phase signal (L) as described above.

In FIG. 20, for the speaker system 700, in the vehicle, a controlling section 750 that controls, for example, opening angles according to listening positions of plurality of listeners and a position detecting section 160 that detects the location of the head of the listener sitting in a seat by receiving signals from contact switches 161 and 162 which detect the front-back position of the seat and the reclining angle, are provided.

The controlling section 750 is configured with microprocessor, acquires head location information of the listener from the position detecting section 160 by executing a control program which will be described later in FIG. 21, outputs to the motor driver section 730 control commands for controlling opening angles, rotations and angles of elevations of the speakers 101 to 104 and the speaker units SP1 and SP2 according to the current first and second positions of listeners and outputs to the sound processing section 141 control signals for controlling the output volumes and phases of output sounds from the speakers 101 to 104. The motor driver section 730 precisely controls the amount of driving of an applicable driving motor according to the control commands and changes the current values of the opening angles, the rotations and the angles of elevations of the speakers 101 to 104 and the speaker units SP1 and SP2 to target values. Further, the sound processing section 141 changes the sound volumes and the phases of the output sounds from the speakers 101 to 104 according to the control signals from the controlling section 750. The sound volumes and the phases are controlled by the sound processing section 141 to adjust the sound pressure level and a shift in phases due to changes of the opening angles of the speakers 101 to 104 and the rotations and the angles of elevations of the speaker units SP1 and SP2 by the driving motors.

Figure 21:
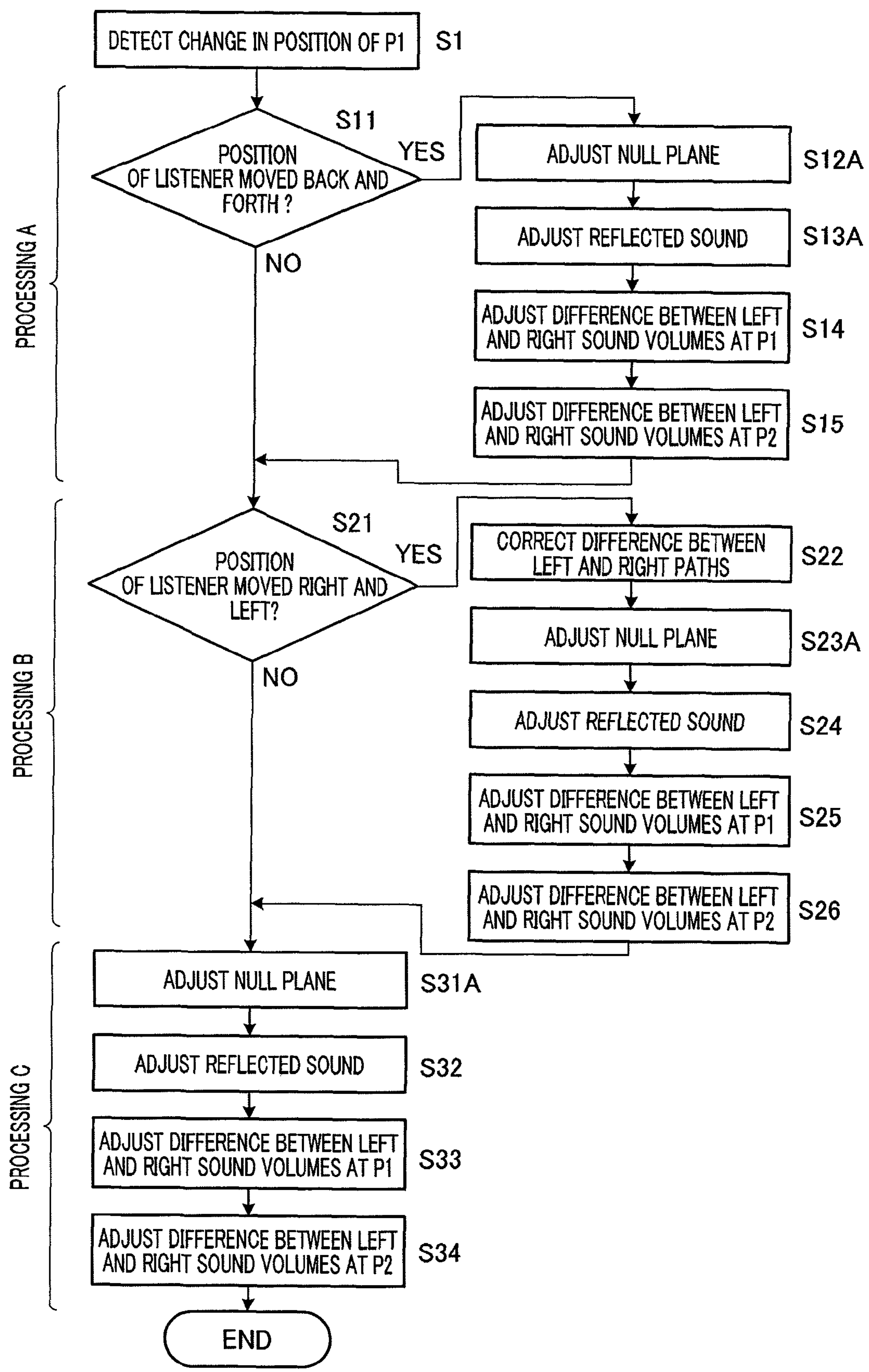
FIG. 21 is a flowchart illustrating automatic adjustment processing of the speaker system according to above Embodiment 2.

FIG. 21 is a flowchart showing automatic adjustment processing of the speaker system 700. This flow is executed repeatedly at a predetermined timing cycle by the CPU in the controlling section 750. The steps carrying out the same processing as in the flow shown in FIG. 18 are assigned the same reference numerals. The letter "A" is assigned to the step numbers of different steps.

Further, although this flow employs an example of movement in the location of the listener P1, the same adjustment processing is executed for movement in the location of the listener P2.

The program starts following a change in the location of the listener P1 (step S1), whether or not the location of the listener P1 moved back and forth is decided in step S11. The movement in the location of the listener P1 is decided by acquiring head location information of the listener from the position detecting section 160 (see FIG. 20). If the location of the listener P1 moves back and forth, the null plane is adjusted in step S12A. The controlling section 750 carries out an arithmetic operation for adjusting the null plane to place a null plane on the first listening position based on the amount of movement in the front-back position of the listener P1, converts the arithmetic operation result into control parameters and outputs the control parameters to the motor driver section 730. The motor driver section 730 drives an applicable driving motor (driving motor 712 in this description) to reach this target value based on the control commands from the controlling section 750. The null plane is adjusted by the "rotation" of the speaker unit SP2. Adjusting the null plane by the rotation is superior to the "differences of angles of elevations" adjustment for inclining the null plane using the line included in the null plane as a reference, in securing the required accuracy. Further, changing the rotation of the speaker unit SP2 provides an effect of more precisely adjusting the difference between the right and left sound volumes.

Next, by changing the opening angle in the speaker unit SP1 in step S13A, reflected sound is adjusted such that quality of sound that is reflected and reaches the listener P1 improves. The decision criterion for this adjustment includes sound pressure, distortion and frequency characteristics. The controlling section 750 stores as a table the relationship between the location of the listener P1 and the opening angle, at which reflected sound is heard the best for the listener P1, in the internal memory in advance and changes the opening angle referring to this table. Adjusting of the opening angles with the present embodiment is directed to adjusting opening angles of the first R channel speaker 101 and the second R channel speaker 102 shown in FIG. 16. The motor driver section 730 adjusts the reflected sound by the driving the driving motor 111 to a predetermined amount and changing the opening angles of the first R channel speaker 101 and the second R channel speaker 102.

Next, the flow proceeds to step S21 by adjusting the difference between the right and left sound volumes in the location of the listener P1 in step S14 and adjusting the difference between the right and left sound volumes in the location of the listener P2 in step S15. Although the reflected sound (Rch in this description) is adjusted by controlling the opening angle, the reflected sound (Rch) is adjusted, and so it is necessary to adjust direct sound (Lch) corresponding to the reflected sound (Rch). By changing the opening angle of the speaker unit SP2 and the sound volume of the third L channel speaker 103, the sound volumes of the right and left channels are adjusted to be the same for the listener P1. The sound volumes of the second R channel speaker 102 and/or the fourth L channel speaker 104 are adjusted such that the sound volumes of the right and left channels become the same for the listener P2. The controlling section 750 outputs to the sound processing section 141 control commands for controlling the output sound volumes and the phases of the output sounds of the speakers 101 to 104. The controlling section 750 adjusts the right and left sound volumes to be the same by outputting to the sound processing section 141 control commands for changing the sound volume of the third L channel speaker 103 and changing the sound volume of the third L channel speaker 103. With Embodiment 1, the "rotation" of the speaker unit is not used. Therefore, for the listener P2, after the difference between the right and left sound volumes in the location of the listener 1 is adjusted, adjustment could be carried out only in accordance with the adjustment of the sound volumes of the speaker unit SP1 and the third L channel speaker 103. However, with the present embodiment, improvement of a sound effect is further realized by applying the "rotation" used to adjust the null plane to adjust the directivity axis (the sound level and the speaker characteristics corresponding to the directivity axis) of the speaker unit SP2.

Processings of the above step S11 to step S15 are referred to as "processing A".

If the location of the listener P1 did not move back and forth in the above step S11 or after processing of the above step S15 is carried out, whether or not the location of the listener P1 moved right and left is decided. If the location of the listener P1 moved to the right and left, the difference between the right and left paths is corrected in step S22. To be more specific, the difference between the right and left paths is adjusted by setting the phase of output sound from the first R channel speaker 101 of the speaker unit SP1 ahead or back of the phases of output sounds of the other speakers 102 to 104.

Next, the null plane is adjusted in step S23A. The method of adjustment uses the "rotation" as in the case of the above step S12A. In case of change to the right and left, given that the null plane significantly moves right and left compared to the case of change to the back and forth, the null plane is adjusted more easily by using the "rotation."

Next, by changing the opening angle in the speaker unit SP1 in step S24, reflected sound is adjusted such that quality of sound that is reflected and reaches the listener P1 improves. The method of adjustment is the same as in the case of the above step S13A.

Next, the difference between the right and left sound volumes in the location of the listener P1 is adjusted in step S25, the difference between the right and left sound volumes in the location of the listener P2 is adjusted in step S26 and the flow proceeds to step S31A. The method of adjustment is the same as in the cases of the above step S14 and step S15. In case of change to the right and left, similar to the case of change to, the back and forth, the sound effect is further improved by using the rotation adjustment to adjust the directivity axis (the sound level and the speaker characteristics corresponding to the directivity axis) of the speaker unit SP2 in step S26.

Processings of the above step S21 to step S26 are referred to as "processing B".

If the location of the listener P1 did not move right and left in the above step S21 or after processing of the above step S26 is carried out, the null plane is adjusted in step S31A. The method of adjustment uses the "rotation" as in the case of the above step S12A.

Next, by changing the opening angle in the speaker unit SP1 in step S32, reflected sound is adjusted such that quality of sound that is reflected and reaches the listener P1 improves. The method of adjustment is the same as in the case of the above step S13.

Next, the same processings as in steps S25 and S26 are carried out in steps S33 and S34, and this flow is finished.

Processings of the above step S31 to step S34 are referred to as "processing C".

The order to execute the above processings A, B and C can be switched. Further, similar to Embodiment 1, the timing to execute this flow is arbitrary, and, for example, the program may be started if the location of the listener changes more than a predetermined distance and may be executed at all time and adjustment may be carried out in real time processing.

In this way, according to the present embodiment, the speaker system 700 has a driving motor 712 for rotating the first speaker unit SP1 and a driving motor 722 for rotating the second speaker unit SP2, so that, similar to Embodiment 1, even if the first and the second listening positions move back and forth, right and left or up and down, it is possible to automatically adjust the directions and outputs sounds of the speakers 101 to 104 and realize a speaker system that is able to provide to a plurality of listeners at the same time a listening environment which does not give a sense of discomfort.

Further, with the present embodiment, if the direction of the null plane in which silence is generated in theory is changed, the speakers 101 to 104 are driven, so that it is possible to more precisely adjust the null plane and the direction axes of the speakers 101 to 104 and produce an more excellent sound effect.

Further, in the above description, the first and the second listening positions are determined in advance and are located near the heads of the listeners sitting in the driver's seat and the front passenger seat. More preferably, in case where the vehicle is a car with right-hand steering wheel, the first listening position is set near the left ear of the listener sitting in the driver's seat and the second listening position is set near the right ear of the listener sitting in the front passenger seat. In case where the vehicle is a car with a left-hand steering wheel, the first listening position is set near the right ear of the listener sitting in the driver's seat and the second listening position is set near the left ear of the listener sitting in the front passenger seat.

The above description is an illustration of a preferred embodiment of the present invention and the scope of the present invention is not limited to this.

Further, although examples have been described with the above embodiments where the present invention is applied to a speaker system arranged on the dashboard in a vehicle, the speaker system may be mounted in other positions in the vehicle. Furthermore, the present invention is applicable to the speaker system installed in, for example, a narrow room other than in the passenger compartment.

Further, although the term "speaker system" is used with the above embodiments for ease of description, other terms are certainly possible, including, for example, "audio system," "audio playback system," "speaker apparatus mounted in the vehicle" and "audio devices mounted in the vehicle."

Furthermore, each circuit section forming the above speaker system, for example, the type, number and connecting method of signal processing sections and position detecting sections are not limited to the above described embodiment.

The disclosure of Japanese Patent Application No. 2006-194812, filed on Jul. 14, 2006, including the specification, drawings and abstract, is incorporated herein by reference in its entirety.

INDUSTRIAL APPLICABILITY

The speaker system according to the present invention is useful as a speaker system installed in the passenger compartment of the vehicle. The present invention is also applicable for use in, for example, products having a plurality of speaker units. Further, the present invention is preferable for the speaker system installed in a narrow space other than in the passenger compartment.

The invention claimed is:

1. A speaker system, comprising:

a first speaker unit including a first speaker outputting a sound to be heard in a first listening position and a second speaker outputting a sound to be heard in a second listening position;

a second speaker unit including a third speaker outputting a sound to be heard in the first listening position and a fourth speaker outputting a sound to be heard in the second listening position;

a driver configured to independently drive at least the first speaker such that a current first listening position is substantially included in a vertical bisector plane of a line connecting an intersection of the first speaker and a directivity axis of the first speaker and an intersection of the second speaker and a directivity axis of the second speaker, and to independently drive at least the fourth speaker such that a current second listening position is substantially included in a perpendicular bisector plane of a line connecting an intersection of the third speaker and a directivity axis of the third speaker and an intersection of the fourth speaker and a directivity axis of the fourth speaker, wherein the first speaker unit and the second speaker unit are separated by a predetermined distance; and a position detecting section that detects a current front-back position and a current reclining angle of a seat, wherein the driver further determines the current first listening position and the current second listening position according to a calculated head position of a seated listener in the seat, and wherein the calculated head position is calculated from the position detecting section that detects the current front-back position and the current reclining angle of the seated listener.

2. The speaker system according to claim 1, wherein:

one of the first speaker and the second speaker receives as an input an in-phase signal of a sound source and an other of the one of the first speaker and the second speaker receives as an input a reverse phase signal of the in-phase signal; and one of the third speaker and the fourth speaker receives as an input an in-phase signal of a same sound source and an other of the one of the third speaker and the fourth speaker receives as an input a reverse phase signal of the in-phase signal.

3. The speaker system according to claim 1, wherein:

the directivity axis of the first speaker is directed toward a first reflecting plane;

the directivity axis of the second speaker is directed toward the second listening position;

the directivity axis of the third speaker is directed toward the first listening position; and the directivity axis of the fourth speaker is directed toward a second reflecting plane.

4. The speaker system according to claim 3, wherein:

a path length through which the sound outputted from the first speaker is reflected by the first reflecting plane and reaches the first listening position, and a path length through which the sound to be outputted from the third speaker reaches the first listening position, are substantially equal; and a path length through which the sound to be outputted from the second speaker reaches the second listening position, and a path length through which the sound to be outputted from the fourth speaker is reflected by the second reflecting plane and reaches the second listening position, are substantially equal.

5. The speaker system according to claim 1, wherein:

the second speaker and the third speaker are fixedly installed; and the driver drives the first speaker and the fourth speaker.

6. The speaker system according to claim 5, wherein the driver changes a difference of an angle of elevation of the first speaker with respect to the second speaker by driving the first speaker at least in a perpendicular direction or changes a difference of angle of elevation of the fourth speaker with respect to the third speaker by driving the fourth speaker at least in a perpendicular direction.

7. The speaker system according to claim 1, wherein the driver drives the first speaker to the fourth speaker.

8. The speaker system according to claim 7, wherein the driver rotates the first speaker unit or the second speaker unit.

9. A speaker system, comprising:

a first speaker unit including a first speaker that outputs a sound to be heard in a first listening position and a second speaker that outputs a sound to be heard in a second listening position;

a second speaker unit including a third speaker that outputs a sound to be heard in the first listening position and a fourth speaker that outputs a sound to be heard in the second listening position;

a motor driver configured to independently drive at least one first driving motor to move at least the first speaker such that a current first listening position is substantially included in a vertical bisector plane of a first line connecting a first point sound source of the first speaker along a directivity axis of the first speaker and a second point sound source of the second speaker along a directivity axis of the second speaker, and to independently drive at least one second driving motor to move at least the fourth speaker such that a current second listening position is substantially included in a vertical bisector plane of a second line connecting a third point sound source of the third speaker along a directivity axis of the third speaker and a fourth point sound source of the fourth speaker along a directivity axis of the fourth speaker, and a position detecting section that detects a current front-back position and a current reclining angle of a seat, wherein the motor driver further determines the current first listening position and the current second listening position according to a calculated head position of a seated listener in the seat, and wherein the calculated head position is calculated from the position detecting section that detects the current front-back position and the current reclining angle of the seated listener.

10. The speaker system according to claim 9, wherein the motor driver independently calculates the vertical bisector plane of the first line connecting the first point sound source of the first speaker along the directivity axis of the first speaker and the second point sound source of the second speaker along the directivity axis of the second speaker, the motor driver independently calculating the vertical bisector plane of the second line connecting the third point sound source of the third speaker along the directivity axis of the third speaker and the fourth point sound source of the fourth speaker along the directivity axis of the fourth speaker.

* * * * *